United States Patent
Coppola et al.

(10) Patent No.: US 10,862,874 B2
(45) Date of Patent: Dec. 8, 2020

(54) APPARATUS FOR USE IN A CAN SYSTEM

(71) Applicants: STMicroelectronics (Grenoble 2) SAS, Grenoble (FR); TECHNOLOGICAL EDUCATIONAL INSTITUTE OF CRETE, Crete (GR); Energica Motor Company S.p.A., Modena (IT)

(72) Inventors: Antonio-Marcello Coppola, Sassenage (FR); Georgios Kornaros, Crete (GR); Giovanni Gherardi, Pelago (IT)

(73) Assignees: STMicroelectronics (Grenoble 2) SAS, Grenoble (FR); TECHNOLOGICAL EDUCATIONAL INSTITUTE OF CRETE, Crete (GR); Energica Motor Company S.p.A., Modena (IT)

( * ) Notice: Subject to any disclaimer, the term of this patent is extended or adjusted under 35 U.S.C. 154(b) by 385 days.

(21) Appl. No.: 15/939,598

(22) Filed: Mar. 29, 2018

(65) Prior Publication Data
US 2018/0295112 A1     Oct. 11, 2018

(30) Foreign Application Priority Data
Apr. 5, 2017    (GR) .............................. 20170100160

(51) Int. Cl.
*H04L 29/06*     (2006.01)
*H04L 29/08*     (2006.01)
(Continued)

(52) U.S. Cl.
CPC .......... *H04L 63/0471* (2013.01); *H04L 9/088* (2013.01); *H04L 9/0833* (2013.01);
(Continued)

(58) Field of Classification Search
None
See application file for complete search history.

(56) References Cited

U.S. PATENT DOCUMENTS 7,343,619 B2 * 3/2008 Ofek ....................... H04L 47/10
                                                                  709/225
7,526,085 B1 * 4/2009 Bong .................... H04L 63/061
                                                                     380/37
(Continued)

FOREIGN PATENT DOCUMENTS

CN          105794146 A         7/2016
CN          106453326 A         2/2017
(Continued)

OTHER PUBLICATIONS

Kuo, Ko-Chi; Hsu, Hsun-Chia. Power line communication chip design with data error detecting/correcting and data encrypting/ decrypting ability. 2012 International Symposium on Intelligent Signal Processing and Communications Systems. https://ieeexplore.ieee.org/stamp/stamp.jsp?tp=&arnumber=6473575 (Year: 2012).*

(Continued)

*Primary Examiner* — Jeremiah L Avery
(74) *Attorney, Agent, or Firm* — Slater Matsil, LLP

(57) ABSTRACT

A CAN device is provided with an encryption function and a decryption function. The encryption function allows messages to be encrypted and put onto a CAN bus. The decryption function allows the messages on the CAN bus to be decrypted. The encryption and decryption functions share keys which change over the course of time.

24 Claims, 16 Drawing Sheets

(51) Int. Cl.
  *H04W 4/48*   (2018.01)
  *H04L 12/417* (2006.01)
  *H04L 9/08*   (2006.01)
  *H04L 9/14*   (2006.01)
  *H04L 9/30*   (2006.01)

(52) U.S. Cl.
  CPC .................. *H04L 9/14* (2013.01); *H04L 9/30* (2013.01); *H04L 12/417* (2013.01); *H04L 63/0435* (2013.01); *H04L 63/0457* (2013.01); *H04L 63/068* (2013.01); *H04L 67/12* (2013.01); *H04W 4/48* (2018.02); *H04L 2209/84* (2013.01)

(56) References Cited

U.S. PATENT DOCUMENTS

| | | | |
|---|---|---|---|
| 7,818,563 B1* | 10/2010 | Dwork | H04L 63/06 |
| | | | 713/151 |
| 2013/0219170 A1 | 8/2013 | Naitou et al. | |
| 2016/0173530 A1* | 6/2016 | Miyake | H04L 67/12 |
| | | | 726/3 |
| 2016/0219051 A1 | 7/2016 | Morita et al. | |
| 2016/0315766 A1* | 10/2016 | Ujiie | H04L 63/068 |
| 2017/0070488 A1 | 3/2017 | Jun | |
| 2017/0134164 A1* | 5/2017 | Haga | G06F 8/65 |
| 2018/0004964 A1* | 1/2018 | Litichever | H04L 12/40143 |

FOREIGN PATENT DOCUMENTS

| | | |
|---|---|---|
| JP | 200423156 A | 1/2004 |
| JP | 2005278007 A | 10/2005 |

OTHER PUBLICATIONS

Basu, Debjani et al. Implementation of AES Algorithm in UART Module for Secured Data Transfer. 2012 International Conference on Advances in Computing and Communications. https://ieeexplore.ieee.org/stamp/stamp.jsp?tp=&arnumber=6305574 (Year: 2012).*

Pfeiffer, Olaf, "CAN security with hidden key generation", CAN Newsletter, Feb. 2016, 3 pages.

* cited by examiner

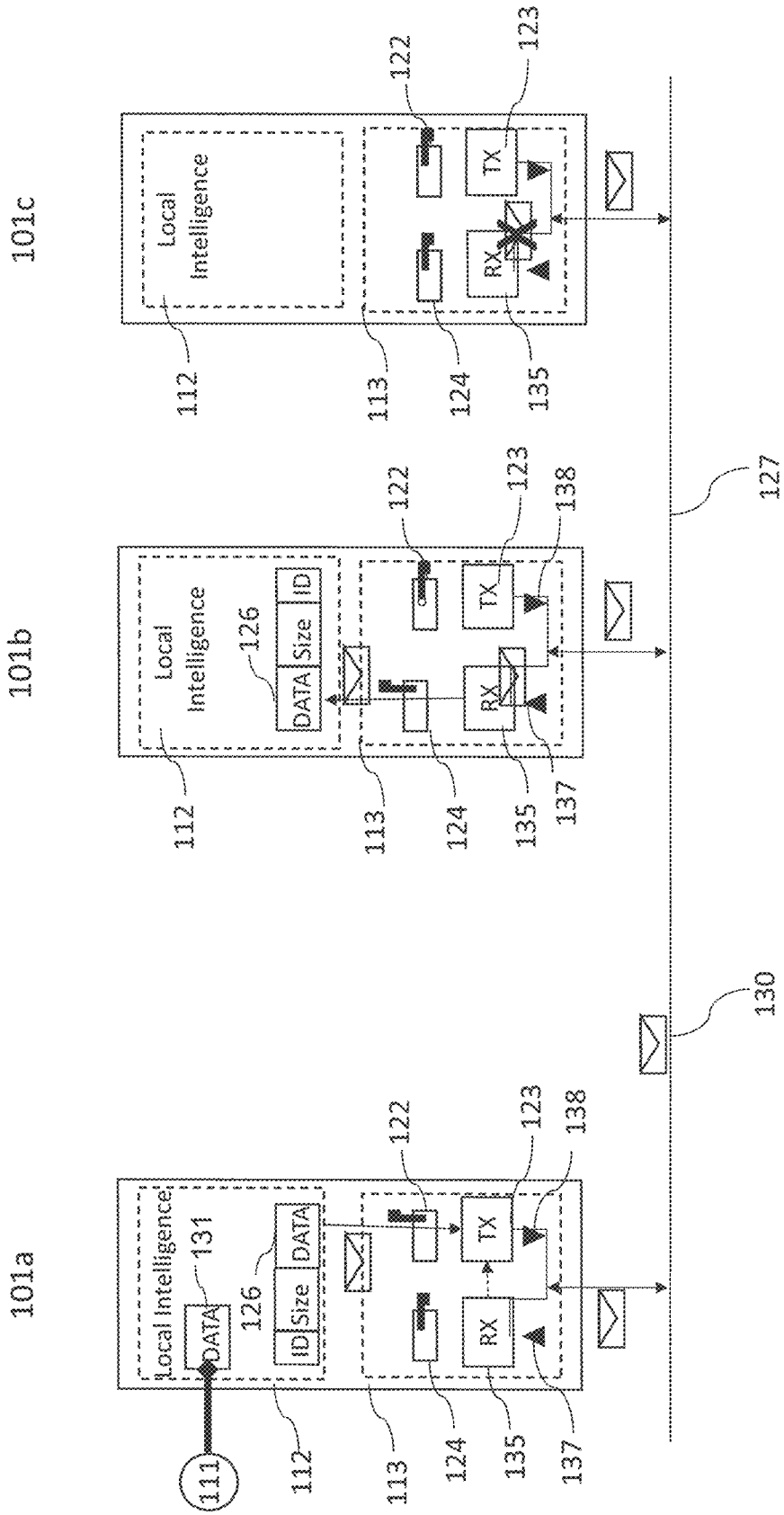

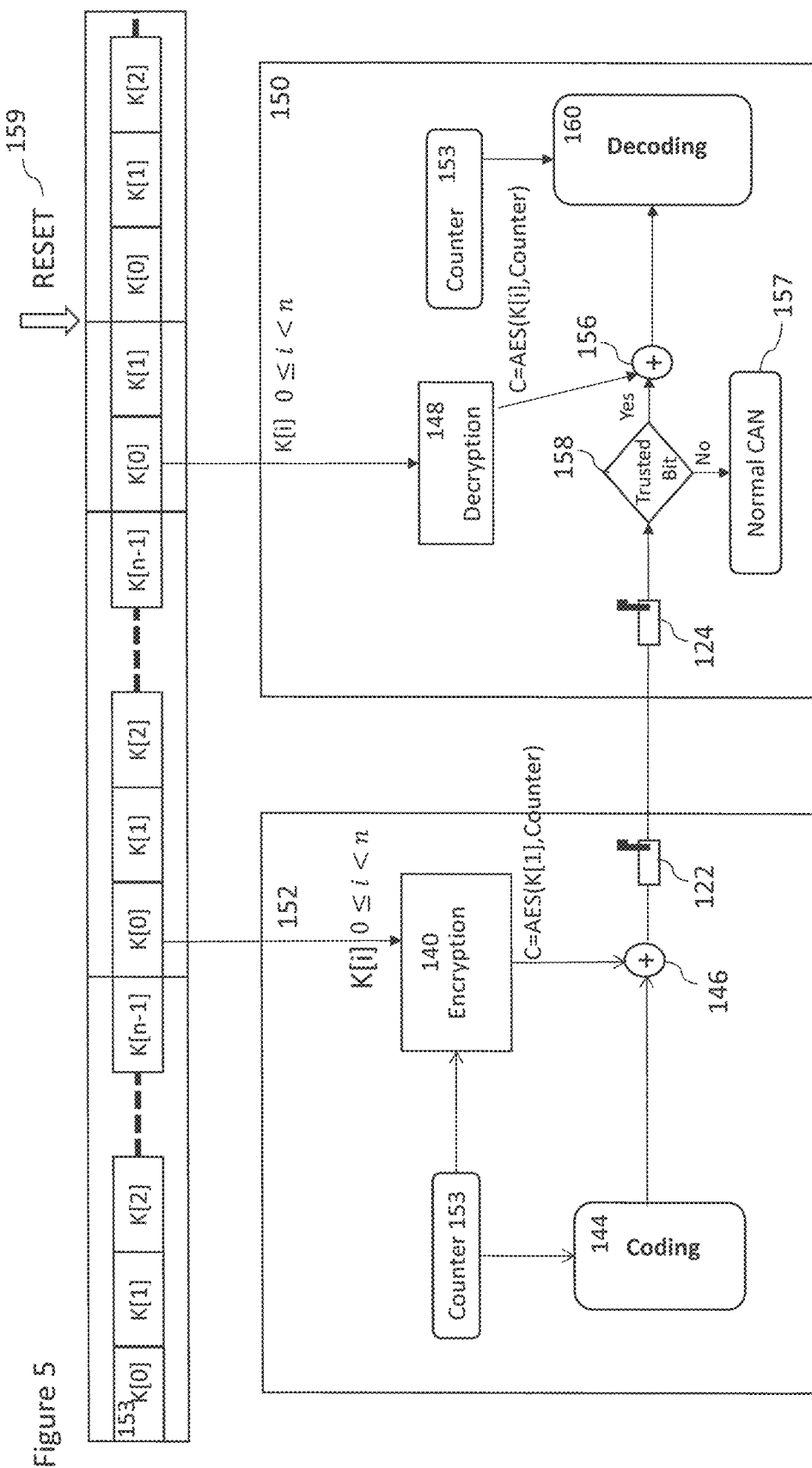

APPARATUS FOR USE IN A CAN SYSTEM

CROSS-REFERENCE TO RELATED APPLICATIONS

This application claims priority to Greek Application No. 20170100160, filed on Apr. 5, 2017, which application is hereby incorporated herein by reference.

TECHNICAL FIELD

Some embodiments relate to a CAN (control area network) system and an apparatus for a device for a CAN system.

BACKGROUND

The Controller Area Network (CAN) protocols were initially developed as an in-vehicle network. CAN has continued to be applied in vehicles and is now applied in a range of different applications. By way of example only, CAN has applications in other forms of transportation such as rail vehicles, aircraft and boats, industrial systems, building automation etc.

As with any network, malicious attacks are a potential problem. For example, falsification of engine control unit ECU readings, disablement of brake function, and other unauthorized control of vehicle components could be the result of a spoofed message injected into the CAN of a vehicle.

Due to the physical and limited properties of CAN, it may be problematic to apply the security measures that are typically used for consumer products or other types of networks. CAN was designed to be a relatively simple protocol where any device connected to the CAN bus can broadcast a message. The message is received by other devices connected to the CAN. Identity information of the type of message is used by the other devices to determine if that message is intended for that device.

Security services for resource constrained platforms such as CAN may be challenging.

SUMMARY

According to an aspect, an apparatus in a device that can be used in a system operating in accordance with a CAN protocol includes an encryption function configured to provide an encryption output. The encryption output is dependent on a key that is shared with at least one other device in the system. The key that is used changes over time. The encryption output and data to be output is used to provide an encrypted CAN frame. An output is configured to cause output the encrypted frame onto a CAN bus. The at least one other device is arranged to receive the encrypted CAN frame via the CAN bus.

The apparatus may comprise a counter such that the counter provides a count value to the encryption function and the encryption output is dependent on the count value.

The counter may be configured to be controlled by a random seed to provide the count value.

The count value of the counter may be configured to be synchronized with that of counters of other devices.

The encryption output may comprise a cipher text.

The apparatus may comprise a coding function configured to scramble at least a part of the data to be output.

At least a part of data to be scrambled may comprise CAN identity data and CAN payload data.

The coding function may be configured to receive a count value from the counter to control the scrambling.

The coding function may be configured to determine a value of a bit the count value and in dependence on the value select a next not already selected bit of CAN identity data or a next not already selected bit of the CAN payload data.

The coding function may be configured to use a current count value of the counter for a particular frame and the encryption output for the particular frame is dependent on a previous count value of the counter.

The coding function may be configured to receive the data to be output and determine from the data to be output if the data is to be encrypted.

The data to be output may comprise information defining a trusted flag, the coding function configured to determine if the data is to be encrypted by determining if the flag is set.

The encrypted frame may comprise the trusted information.

The apparatus may comprise a memory for storing the keys and/or the seed. The memory may comprise a tamper-proof or secure memory. The memory may be a non-volatile memory.

The apparatus may be configured to receive a CAN frame and in response thereto to change the key.

The key may be changed in response to a reset frame; a synchronization frame, a transmission of n frames where n is an integer greater than or equal to one or expiry of a predetermined period of time.

A priority bit may be provided in a CAN identifier of the CAN frame.

According to another aspect, an apparatus in a device that is used in a system operating in accordance with a CAN protocol comprises an input configured to receive an encrypted frame from a CAN bus from another device in the system. A decryption function is configured to provide a decryption output that is dependent on a key, which is shared with at least one other device in the system. The key which is used changes over time and the decryption output being used to decrypt the encrypted CAN frame provides a decrypted output.

The apparatus may comprise a counter such that the counter provides a count value to the decryption function and the decryption output is dependent on the count value.

The counter may be configured to be controlled by a random seed to provide the count value.

The count value of the counter may be configured to be synchronized with that of counters of other devices.

The decryption output may comprise a cipher text.

The apparatus may comprise a decoding function configured to descramble at least a part of the decrypted output.

The at least a part of the decrypted output to be descrambled may comprise scrambled CAN identity data and scrambled CAN payload data.

The decoding function may be configured to receive a count value from the counter to control the descrambling.

The coding function may be configured to determine a value of a bit the count value with respect to a flag and in dependence on the value select a next not already selected bit of CAN identity data or a next not already selected bit of the CAN payload data.

The decoding function may be configured to use a current count value of the counter for a particular frame and the decryption output for the particular frame is dependent on a previous count value of the counter.

The apparatus may be configured to determine from the encrypted CAN frame if the data is to be decrypted.

The CAN frame may comprise information defining a trusted flag, the decoding function configured to determine if the data is to be decrypted by determining if the flag is set.

The encrypted frame may comprise the trusted information.

The apparatus may comprise a memory for storing the keys and/or the seed. The memory may comprise a tamper-proof or secure memory. The memory may be a non-volatile memory.

The apparatus may be configured to receive a CAN frame and in response thereto to change the key.

The key may be changed in response a reset frame, a synchronization frame, a transmission of n frames where n is an integer greater than or equal to one, or expiry of a predetermined period of time.

A priority bit may be provided in a CAN identifier of the CAN frame.

According to another aspect, a device may comprise the apparatus as defined in each of the preceding aspects.

The device may be configured to have one counter which is shared between the apparatuses.

The device may be configured such that the keys are shared between the apparatuses.

According to another aspect, a method can be used in a system operating in accordance with a CAN protocol. The method comprises providing an encryption output that is dependent on a key, which is shared between a plurality of devices in the system. The key which is used changes over time. The encryption output and data to be output are used to provide an encrypted CAN frame and the encrypted frame is output onto a CAN bus.

The method may comprise using a count value to provide the encryption output.

The method may comprise using a random seed to control the count value.

The count value may be synchronized across the plurality of devices in the system.

The encryption output may comprise a cipher text.

The method may comprise scrambling at least a part of the data to be output.

At least a part of data to be scrambled may comprises CAN identity data and CAN payload data.

The method may comprise using a count value to control the scrambling.

The method may comprise determining a value of a bit the count value and in dependence on the value select a next not already selected bit of CAN identity data or a next not already selected bit of the CAN payload data.

The method may comprise using a current count value for a particular frame and the encryption output for the particular frame is dependent on a previous count value.

The method may comprise receiving the data to be output and determining from the data to be output if the data is to be encrypted.

The method may comprise determine if the data is to be encrypted by determining if a trusted flag is set.

The encrypted frame may comprise the trusted information.

The method may comprise receiving a CAN frame and in response thereto to changing the key.

The method may comprise changing the key is changed in response a reset frame, a synchronization frame, a transmission of n frames where n is an integer greater than or equal to one, or expiry of a predetermined period of time.

According to another aspect, a method can be used in a system operating in accordance with a CAN protocol. The method comprises receiving an encrypted frame from a CAN bus from a device in the system. A decryption output is dependent on a key that is shared by a plurality of devices in the system. The key which is used changes over time. The decryption output is used to decrypt the encrypted CAN frame to provide a decrypted output.

The method may comprise using a count value to provide the decryption function.

The method may comprise using a random seed to control the count value.

The count value may be synchronized across the plurality of devices in the system.

The decryption output may comprise a cipher text.

The method may comprise descramble at least a part of the decrypted output.

At least a part of data to be scrambled may comprises CAN identity data and CAN payload data.

The method may comprise using a count value to control the descrambling.

At least a part of the decrypted output to be descrambled comprises scrambled CAN identity data and scrambled CAN payload data.

The method may comprise receive a count value from the counter to control the descrambling.

The method may comprise determining a value of a bit the count value and in dependence on the value select a next not already selected bit of CAN identity data or a next not already selected bit of the CAN payload data.

The method may use a current count value of the counter for a particular frame for descrambling and the decryption output for the particular frame is dependent on a previous count value of the counter.

The method may comprise determining from the encrypted CAN frame if the data is to be decrypted.

The method may comprise determining if the data is to be decrypted by determining if the flag is set.

The encrypted frame may comprise the trusted information.

The method may comprise receiving a CAN frame and in response thereto to changing the key.

The method may comprise changing the key in response a reset frame, a synchronization frame, a transmission of n frames where n is an integer greater than or equal to one, or expiry of a predetermined period of time.

According to another aspect, there is provided a computer program comprising computer executable code which when run on at least one processor causes the method of any of the above aspects to be implemented.

The computer program may be provided on a non-transitory medium.

BRIEF DESCRIPTION OF THE DRAWINGS

For a better understanding of some embodiments, reference will now be made by way of example only to the accompanying drawings in which:

FIG. 3 schematically shows a CAN flow model;

FIG. 5 shows the encryption and decryption functions of the node of FIGS. 4a and 4b in more detail;

DETAILED DESCRIPTION OF ILLUSTRATIVE EMBODIMENTS

Figure 1:
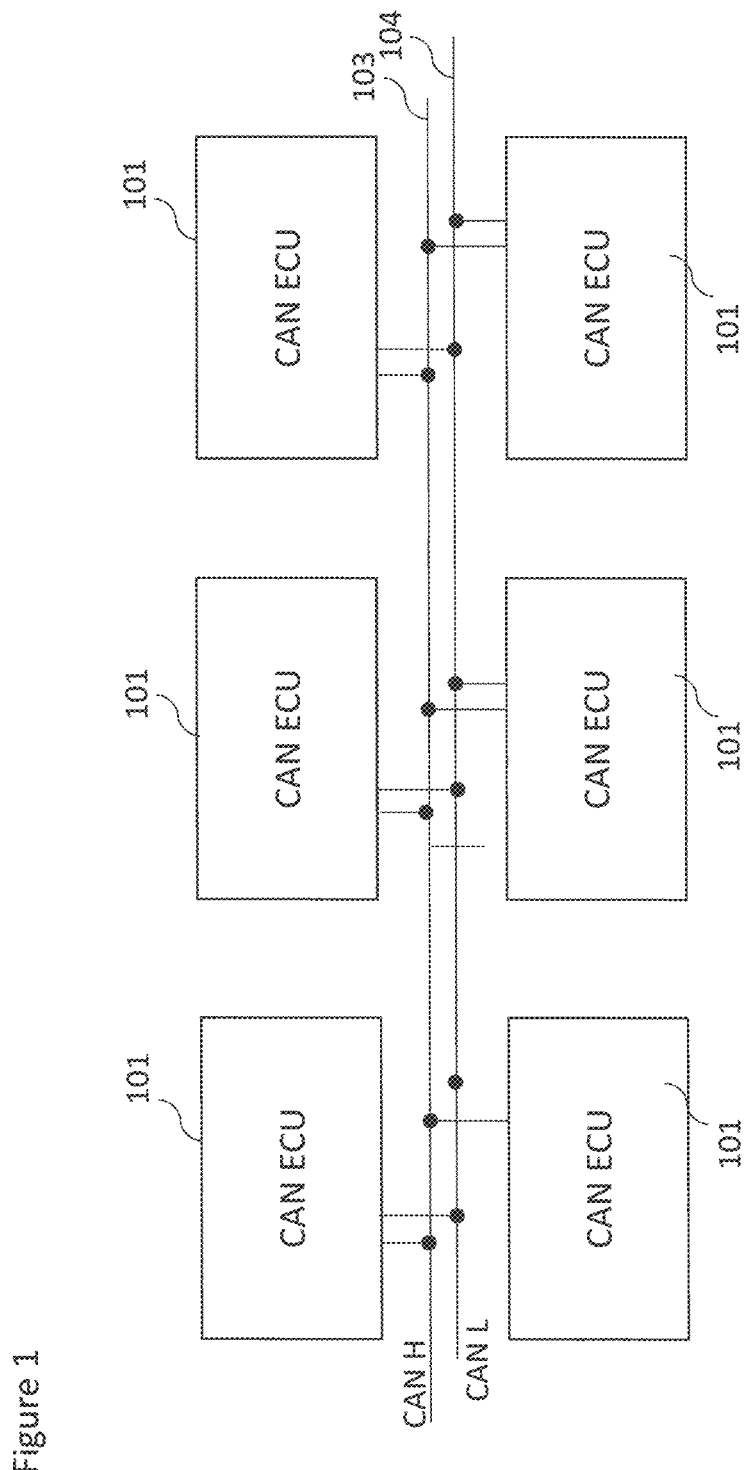
FIG. 1 schematically shows a CAN network.

Embodiments may provide security in the context of a CAN system.

It should be appreciated that there are a number of different specifications for the CAN protocol which are in use. There is for example a specification which has an 11 bit identifier, for example CAN 2.0A. Another option has an extended format which has a 29 bit identifier, for example CAN 2.0B. There is also the so-called CAN-FD (flexible data rate) specification. This has a different frame format which has a different data length (up to 64 bytes as comparted to up to 8 bytes with CAN 2.0 A/B). The different data length means a change to the field which indicates the size of the payload and a different CRC field. The CAN protocol may use a reserved bit R0 in the CAN "normal" mode frame to differentiate between a "normal" and a FD mode. When the reserved bit is 0 (dominant) the frame is a CAN "normal" frame otherwise when it is 1 (recessive), this denotes a CAN FD frame.

There are versions of CAN which have been released by the ISO—e.g. ISO 11898. It should be appreciated that embodiments are applicable to any of the CAN specifications, including the above mentioned example and any other versions or specifications. References to CAN in this document should, unless indicated otherwise be construed to cover any CAN protocol or specification.

In some embodiments, in the context of a CAN system, a key based algorithm may be used to provide security. In some embodiments a standard key based algorithm may be used. A symmetrical algorithm may be used.

Keys may be stored in internal or external tamper proof memory of the CAN controllers, described later. Periodically the key may be changed. This may be at regular time intervals or may be controlled by explicit signaling. In this latter case a specific type of CAN frame may be used.

Some embodiments may use secure cryptographic mechanisms such as for example, AES (advanced encryption standard), DES (data encryption standard), and RSA etc.

CAN entity authentication may be achieved via possession of a physical token such as a password or a key.

Some embodiments may secure communication using symmetric key temporal sessions combined with CAN ID hopping applied to each payload, as will be discussed in more detail.

Some embodiments may provide ultra-light weight block cipher. For example, in some embodiments secure CAN (sCAN) can encrypt CAN and Local Interconnect Network (LIN) messages in real time (less than 1 ms). LIN operates under a CAN platform.

Some embodiments may provide a method and apparatus for securing the CAN communication while keeping the real-time properties. As will be discussed later in some embodiments, a secure broadcast group within the CAN network may be defined. Secure broadcast communication within the secure group may be supported. This may support any suitable high level protocol, for example KW2000 (Keyword Protocol 2000) or the like. KW2000 is a communications protocol that may be used for on-board vehicle diagnostic systems.

In some embodiments, as will be discussed later, a trusted group and an untrusted group among the different devices connected to the CAN may be defined.

Some embodiments may secure the communication between secure CAN bus devices while still supporting legacy CAN devices. No changes are required to the standard CAN protocol(s) and hardware, in some embodiments.

Some embodiments may require low computation capabilities that enable real-time support. Thus embodiments may be used with resource constrained CAN devices.

In some embodiments, as will be discussed later, secure and non-secure communications may be supported in parallel.

Reference is made to FIG. 1 which schematically shows a CAN network. A plurality of different CAN devices 101 is shown. Each of the CAN devices is connected to CAN bus. The CAN bus comprises a CAN H signal line 103 and a CAN L signal line 104. The CAN bus is defined by the two signal lines which are used to transmit CAN frames.

As mentioned previously, the CAN system is typically used in the context of a vehicle. Accordingly, in this example, each CAN device may be an engine control unit ECU. However, it should be appreciated that this is by way of example only and the CAN device may be any suitable device dependent on the context in which the CAN protocol is deployed.

Figure 2:
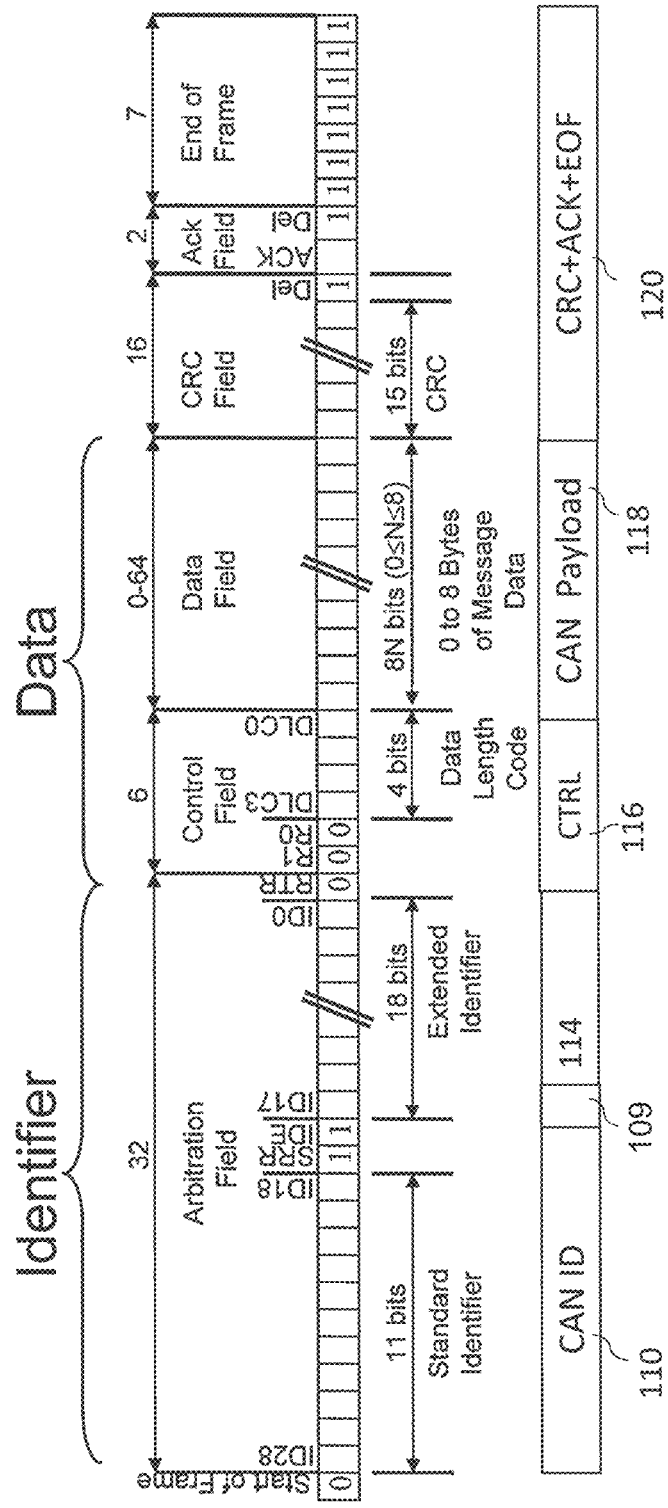
FIG. 2 shows a CAN frame, as modified by some embodiments.

A CAN frame is schematically shown in FIG. 2. This is the CAN frame for example for CAN 2.0 The CAN frame has an identifier ID part. The CAN identifier comprises a standard ID part 110 which is the standard ID part. Also shown is the extended identifier part which in FIG. 2 is referenced 109 and 114. The extended identifier part is for example used in CAN 2.0B. The identifier part is used to indicate what is provided by the message. Knowing the ID one or more devices may decide to read and to use the provided info.

The frame also comprises a data part. The data part has a CTRL control part 116 and a payload part 118. The control part is a composed by four DLC (data length code) bits that specify the payload length (from 0 to 8 bytes) and R0/R1 bits that are reserved. The data payload part 118 will also include the frame or payload information and has a maximum size of 8 bytes. (In CAN FD this part is 64 bytes long).

The last part of the frame comprises a CRC (cyclic redundancy check) field, an acknowledgement field and an end of frame part.

It should be appreciated that the CAN 2.0 frame is shown by way of example. Other embodiments may be used with CAN FD or indeed any other version of CAN.

The CAN frame shown in FIG. 2 has referenced the first bit of the extended header with reference numeral 109. In some embodiments, this first bit of the extended header is designated as a trusted bit. This will be described in more detail later.

Reference is made to FIG. 3 which schematically shows the CAN flow model for a data transmission and reception process. In the example shown in FIG. 3, there are three CAN devices or nodes 101a, 101b and 101c. Each node comprises a local intelligence 112 which is able to process received data and/or output data. The local intelligence may be implemented by one or microcontrollers or circuits, in conjunction with memory. Each node comprises a CAN module 113 that is configured to output data onto the CAN bus or receive data from the CAN bus. The CAN Module includes a CAN controller and a CAN transceiver. The CAN Controller may be embedded in the local intelligence 112 or may be external to the local intelligence 112. As is generally known, the CAN controller implements the data link operation. The CAN transceiver is located between the local intelligence 112 and the CAN Bus 127 and implements the physical layer operations.

The CAN controller may be configured to support the normal mode and/or CAN FD. As can be seen, the local intelligence 112 may be connected to one or more of a sensor and an actuator or the like 111. For example the sensor may be an engine speed sensor, temperature sensor, oil pressure sensor, etc. The sensor and/or actuators may store/read their values in the input/output memory 131 of the local intelligence 112. The sensor and/or actuators values may be stored or read at regular intervals. These values may be transmitted by copying to the memory 126 of the local intelligence or may be received by copying from the memory 126. There may be a common memory for receive and transmit data or separate memories therefor. The local intelligence may be programmed to determine the meaning of a message that has to be transmitted or has been received. The local intelligence for the outgoing messages adds the size and the ID to the transmit memory 126 while it uses these information from the receive memory to identify the actuator or the operation to be performed. It should be appreciated that in some embodiments, the CAN ID may be provided by the local intelligence 112 in accordance with a suitable high level protocol, for example KW2000.

From the transmit memory 126 the information goes to the transmit mailbox 122 of the CAN controller module 113 and then the transmit flag is raised. Once the message is sent to the CAN module 113, the local intelligence has completed its task for this transmission process. The CAN module 113 checks via the RX signal line 137 of the receiver function 135 whether the bus 127 is active (whether data is in the process of being exchanged). If necessary, the CAN module waits until the bus is free. If the CAN bus 127 is free, the data is started to be sent by the transmission function 123. If the transmission of CAN frame 130 is successful, then the mailbox 122 will be reset. When the mailbox is reset a new transmission process can be started.

In the example of FIG. 3, the first node 101a is transmitting the CAN frame 130. All connected nodes receive the CAN Frame 130 sent by the node 101a over the RX lines 137 to the respective receive mailbox 124 of the CAN nodes. This reception phase mainly is composed of two steps: check message for errors and check message for acceptance.

The first step is realized using the CRC checksum. This can detect whether any errors have occurred in transmission. When a CAN frame is sent, a checksum is generated from all the bits and included in the CAN frame. The receivers calculate the checksum from all the bits received using the same protocol. Then the received checksum is compared with the calculated checksum. If no error is found, all the nodes send an acknowledgement to the transmitter node 101a confirming correct reception.

Finally for the correctly received frame the acceptance step is performed by raising the receive flag of the receive mailbox 124. The local intelligence gets the received information into the receive memory or buffer 126. The information will include the ID, the size and the data. First by looking at the ID a decision is made whether the CAN Frame has to be accepted by that node. If not, the frame is discarded. Otherwise the frame can be used by the node.

In order to reduce the computation of the reception a filter may be provided in each of the CAN nodes. The filter is configured to determine whether or not a frame on the bus is intended for the respective node. The filter may be provided at any suitable location of the CAN module 113.

In embodiments, one node transmits. All the nodes listen and process data frames selectively. The message filtering is typically performed in transceiver hardware by the filter.

The filter mask is used to determine which bits in the identifier of the received frame are compared with the filter. If a mask bit is set to a zero, the corresponding ID bit will automatically be accepted, regardless of the value of the filter bit.

If a mask bit is set to a one, the corresponding ID bit will be compared with the value of the filter bit; if they match it is accepted otherwise the frame is rejected.

Example 1: accept only frames with ID of 00001567 (hexadecimal values). The filter is set to 00001567 and the mask is set to 1FFFFFFF. When a frame arrives its ID is compared with the filter and all bits must match; any frame that does not match ID 00001567 is rejected.

Example 2: accept only frames with IDs of 00001560 through to 0000156F. The filter is set to 00001560 and the mask is set to 1FFFFFF0. When a frame arrives its ID is compared with the filter and all bits except bits 0 to 3 must match; any other frame is rejected.

Example 3: accept only frames with IDs of 00001560 through to 00001567. Set filter to 00001560 and set mask to 1FFFFFF8. When a frame arrives its ID is compared with the filter and all bits except bits 0 to 2 must match; any other frame is rejected.

Example 4: accept any frame. Set filter to 0 and set mask to 0. All frames are accepted.

In some embodiments, for legacy CAN devices, the filters and masks are set up for the IDs which they would like to receive. Secure CAN devices are set up with the filters and masks set to 0. The MAC will in this case determine whether to accept or reject a CAN frame.

This data flow can support a broad range of communication models. For example, a master/slave model may be supported. In this model, all communications are initiated by a master node. In a peer-to-peer mode, nodes interact autonomously with equal authority. In a producer/consumer model, a producer node broadcasts or pushes messages to consumer nodes. In a client/server model, client nodes request or pull data from server noes. It should be appreciated that a given CAN network may support one or more of these different models.

In the example shown in FIG. 3, CAN node 101a transmits a message. This message is received by each of the other nodes. In this example, CAN node 101b receives and processes the message. However, CAN node 101c ignores the message.

Figure 4A:
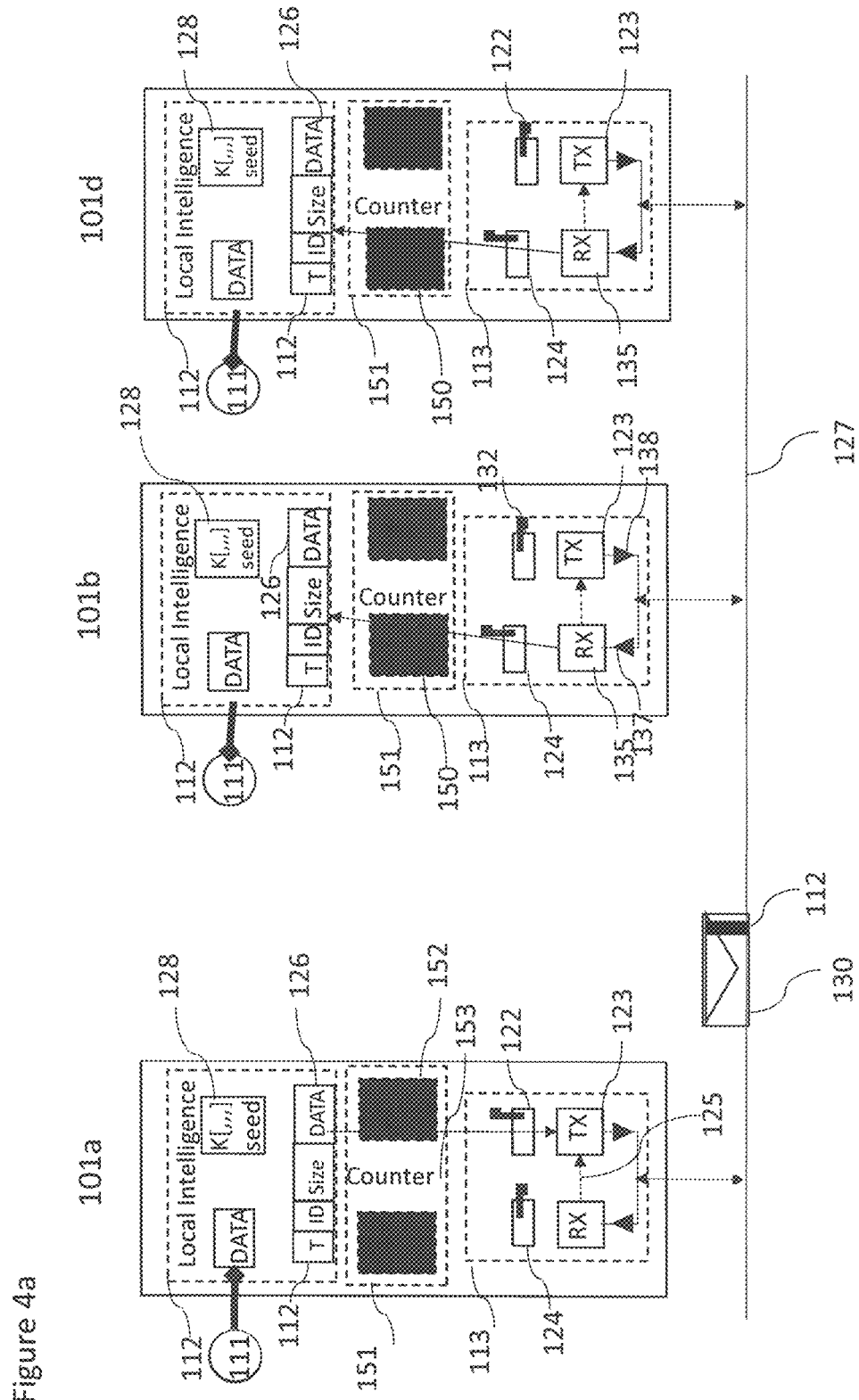
FIG. 4a schematically shows a CAN flow model used in some embodiments.

Reference is now made to FIG. 4a which shows a system of some embodiments of a secure CAN system that is configured to detect trusted and not trusted CAN frames and to implement an extension of the CAN protocols and specification. In some embodiments, a trusted flag 112 can be provided in the CAN frame 130 by setting one of the bits of the identifier (as shown for example in FIG. 2), a reserved bit (R0) or by using one or more of the unused coding values of DLC (e.g., 1111). The bit R0 may be used only with CAN and not if CAN FD is also supported. The selected bit is referred as trusted bit (or values) 112. The trusted flag when raised implies a transmission of secure CAN frames with a trusted bit set with a dominant value. Only trusted CAN nodes can receive, decode and process correctly secure CAN frames. When no such bit is used all CAN frames transmitted on the bus are either secure or not secure. In other words, if there is no trusted flag option, there may not be co-existence of secure and non-secure CAN frames.

When several nodes attempt to send at the same time, there would be a data collision on the CAN bus. In order to arbitrate the collisions the CAN protocol defines that all transmitting nodes monitor the bus traffic by RX line 137. Thus each transmitter node compares the state of the TX line 138 bit-by-bit with the state of the RX line 137. When a difference is noted, the node whose TX signal was overwritten by a zero must withdraw from the bus. Thus the lower the number in the identifier, the more important the message.

In some embodiments, another bit within the CAN ID field may be used as a priority bit enabling the managing of the frame weighting between secure and not secure CAN frames. The priority bit may split the range of the ID into 2 subsets—one with a higher priority and one with a lower priority. When CAN frames may be either secure and not secure, the priority bit splits for both secure and non-secure frames in 2 subsets, providing a total of four subsets.

In the context of a trusted communication between two entities on the CAN bus, where the communication is trusted the trust flag is raised via one of the methods above mentioned by the local intelligence 112. The CAN filter may be disabled in the presence of trusted frames. In some embodiments, the frames are accepted or rejected at the CAN module 113.

The CAN nodes of some embodiments have a sCAN module 151 with a transmitter sCAN sub module 152, a sCAN receiver sub-module 150 and a counter 153. The transmitter sub-module handles the CAN Frame before transferring to the mailbox 122. The receiver submodule receives the CAN Frame from the mailbox 124, handles it and sends to the local intelligence 112.

In the following, each CAN node which is to be trusted to include a set of keys K [0 . . . n] and a seed stored in a secure memory 128 that are used by the sCAN Module 151. A global reset is performed at time 0 which uses Key[0] and an initial "seed" value. This seed is used to initialize the counter 153 using RND(Seed) function.

The global reset will be performed on each of the nodes at the start of operation, at a constant time interval, a variable time interval and/or after a SYNC (synchronize) command.

In two (or multiparty) party trusted communication, after sending the first frame, both counters are updated. The counters are used to shuffle the CAN frame that has to be transmitted. Since the seed is the same, the two counters included in the two nodes will contain the same value.

In one embodiment information stored in the transmit memory by the local intelligence will also include the trusted flag 112. As discussed previously, the trusted flag denotes if the actual CAN frame is trusted or untrusted. The trusted flag will be mapped to the CAN frame using one of the possibilities mentioned previously by the trusted bit 112.

Figure 4B:
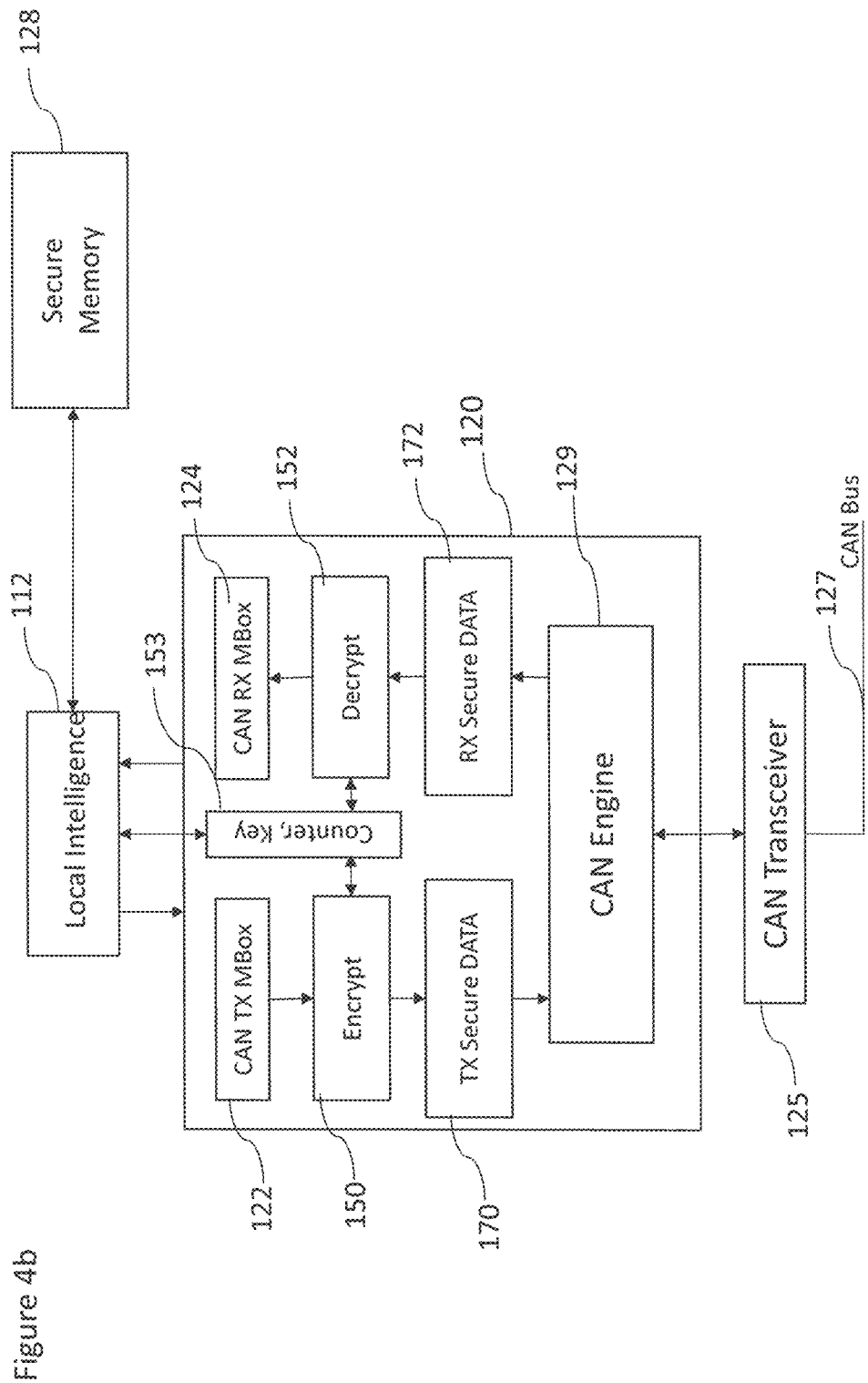
FIG. 4b shows a node of FIG. 4a in more detail.

Reference is now made to FIG. 4b which shows a schematic functional block diagram of a secure CAN apparatus of some embodiments. The local intelligence 112 is coupled with a sCAN controller 120 and the sCAN controller is coupled with a CAN transceiver 125. The sCAN controller comprises a CAN engine 129 that implements the CAN protocol discussed previously, the transmit mailbox 122 as well as the receive mailbox 124. The sCAN controller has the transmitter sCAN sub module 152 (encryption), the sCAN receiver sub-module 150 (decryption), a transmit TX secure buffer 170, a RX secure buffer 172, finally the counter 153 and the associated current key registers that are shared between the encryption and decryption blocks. The memory 128 is the secure location where the seed of the counter and the set of keys are securely stored.

The CAN transceiver 125 comprises the transmission function 123 and the receiver function 135, discussed previously.

Reference is now made to FIG. 5 which shows in more detail the transmitter sub-module 150 and the receiver sub-module 152 of FIGS. 4a and 4b. Each CAN node which supports the secure mode of operation will typically have both encryption 140, and coding 144 (transmitting) parts and decryption 148 and decoding 160 (receiving) parts.

Referring the first to the transmitting sub-module 150, the device has an encryption function 140 which is configured to perform any well know cryptographic function for instance the AES, RSA etc. The encryption function 140 may be implemented using encryption circuitry that includes one or microcontrollers or circuits, in conjunction with memory.

In the following, AES is used as an illustrative example. The encryption algorithm 140 receives as input parameters a key K[i] 143 where $0<=i<n$ and the output from a counter 153 and the location of the transmit memory where the information defining the CAN frame has been stored. This will cause the encryption algorithm 140 provide a preliminary cipher text output C=AES(K[i],Counter) which is combined via a XOR 146 with the output of a coding part 144. The coding part applies the coding to the referred CAN frame in the transmit memory. Then, the XOR function 146 will provide a final cipher text output which represents the encrypted CAN frame. The cipher text will have a length of 75 bits, 93 bits, 523 bits or 541 bits depending on the version of the CAN frame used and between normal and FD ones.

The receiving submodule 152 is configured to receive the cipher text from the mailbox 124. Then, a check is made at block 158 to see if the trusted bit is dominant or "set". If the Trusted bit is not dominant, the normal CAN operation is performed as described previously. The normal CAN operation is represented by function block 157.

If the trusted bit is dominant the cipher text is passed through to an XOR function 156. The XOR function 156 is arranged to receive an output C=AES(K[i],Counter) from the decryption function 148 which is configured to perform the corresponding decryption algorithm. The decryption function 148 received as an input the same key value K[i] and the same counter value from the counter 153. The counter is computed as RND( ) using the same seed used in the transmitter sub-module. The decryption output, referred to as preliminary cipher text from the decryption function 148 is applied to the received cipher text by the XOR function 156. The outcome of the XOR function is then sent to the decoding part 160. The output of the decoding is a plain CAN frame that is stored in the receive memory and that can be used by the local intelligence. It should be appreciated that a global reset 159 will ensure that the same key is used by the encryption function 140 and the decryption function 148. Keys in CAN nodes are changed periodically. The period 153 of the time slot when the keys are changed may be determined by counting the number of transmitted trusted frames.

The decryption function 148 may be implemented using decryption circuitry that includes one or microcontrollers or circuits, in conjunction with memory. In some embodiments, the encryption function 140 and the decryption function 148 will share hardware.

Likewise, the counters will each be initialized by the same random number so that the counters provide the same output to the encryption and decryption function. For a given frame, it is encrypted in one CAN node and decrypted in one or more other nodes.

Figure 6:
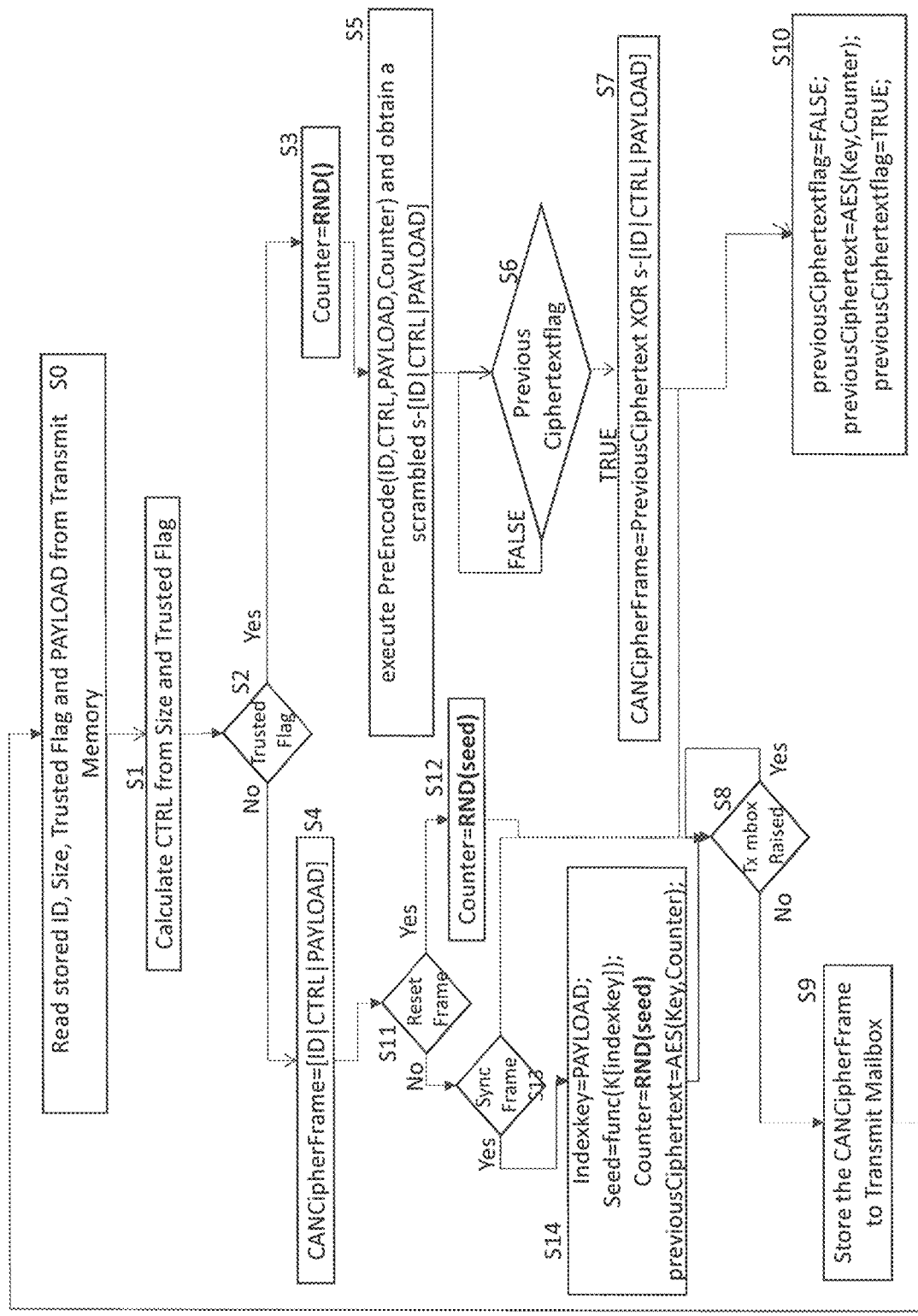
FIG. 6 shows a method flow for the transmitting of frames.

Reference will now be made to FIG. 6 which shows a method for preparing and transmitting a frame in some embodiments.

The method is initialized executing step S10 and then started with step S0.

In step S0, it is determined if a new CAN ID, payload, size and trusted flag has been stored in the transmit memory. If not, the determination is repeated.

If such a new CAN ID, payload, size, trusted flag have been received, then the next step is step S1. In step S1, the control field CTRL is created using the trusted flag and the size information. Then the next step is step S2.

In the step S2 the trusted flag is checked. If it is false, then step S4 is executed where the CAN Cipher Frame is built using the ID, CTRL and PAYLOAD. The next step is after step is then step S11.

Instead, when the trusted flag is true the next step is step S3.

In the step S3 the value provided by the counter is updated to the next value. The values which are output by the counter will depend on the seed initially used. The next step is S5.

In step S5 an encode function using the current value of counter is applied to the ID, CTRL, PAYLOAD and a scrambled ID and payload (s-[ID|CTRL|PAYLOAD]) is obtained. It should be appreciated that in this step the defined trusted bit is also set.

In step S6, it is determined if a previous cipher text flag is true. If not the determination is repeated. If the previous cipher text flag is true, the next step is step S7. The previous cipher text flag will be true if the cipher text has be generated using the previous (n−1th) value of the counter and the past value of the key, where the current value of the counter used for the scrambling is the nth value. The current value of the key may be the same if we are on the same time slot.

In step S7, the CAN cipher frame is determined by the previous cipher text being XORed with the scrambled ID, CTRL and payload. (CAN Cipher Frame=Previous Cipher text XOR s-[ID|CTRL|PAYLOAD]. The next steps are S8 and S10 that are executed in parallel. It should be appreciated that this parallelism is used to support the real-time property in some embodiments.

In step S8, it is determined if the transmit mailbox has been already raised. If the mailbox has been raised the determination is repeated. If the transmit mailbox is not raised, the next step is steps S9.

In step S9, the CAN Cipher Frame is stored into the Transmit Mailbox and the related flag is raised. The next step is step S0.

In the step S10, the previous cipher text flag is set to false and a new previous cipher text is generated based on the count value before the updating in step S3. Then, the previous cipher text flag is set to true.

Since the cipher text includes the CAN ID and the CAN Payload encoded following the encode function the actual CAN ID that will be sent on the CAN bus is a mixed set of bits coming from the CAN payload and CAN ID. The actual CAN ID is then a cryptographically secure pseudorandom CAN ID.

In step S11, it is determined if the frame is a reset frame. If not, then the next step is step S13, otherwise the next step is step S12.

In step S12, the RND function is reset. It means that it start with the first number again. The next step is step S8.

In step S13, it is determined if the frame is a sync frame. If no, then the next step is step S8, otherwise the next step is step S14.

In the step S14, the index of the current key is reset to a value calculated by the value of the payload modulo the maximum number of stored keys. Then, the new seed is calculated using a custom function which takes as argument the value of K(index). The counter is calculated as counter=RND(seed) and the Previous Cipher text is determined using any suitable cryptographic function applied to the key[index] and counter. The next step is step S8.

Figure 7:
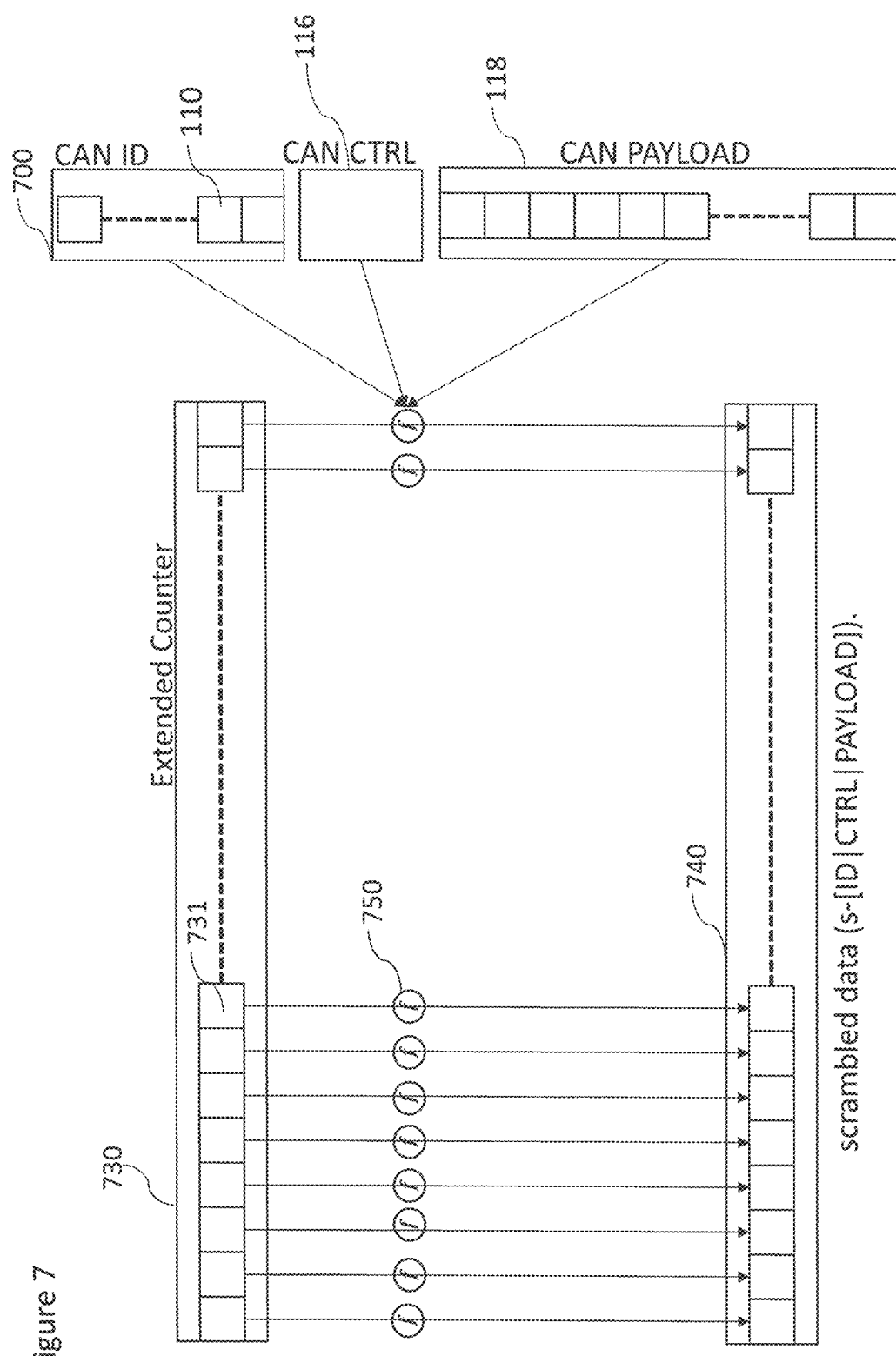
FIG. 7 shows the scrambling of data prior to encryption.

Reference is made to FIG. 7. The counter 153 of the previous FIG. 5 is shown in FIG. 7 as being extended to a number of bits equal to sum of the size of CAN ID 110 (this may include the parts of FIG. 2 referenced 112 and 114), CAN control 116 and CAN PAYLOAD 118 using a predefined function. The extended counter is referenced 730 and is shown in FIG. 7 as a set of bits 731.

A CAN buffer 740 is provided where the bits of the CAN ID are shuffled, the bits of the CAN PAYLOAD are shuffled but the bits of the CAN CTRL are copied in the same position as in the standard CAN frame shown in FIG. 2 or the appropriate CAN frame for the particular CAN standard being used.

In order to obtain a scrambled ID, DLC, and payload (s-[ID|DLC|PAYLOAD]) the same function f is applied in a sequential way to each bit of the extended counter 730. In other words the function is first applied to bit 0, than to bit 1 and so on. The outcome of the function f, denoted by reference numeral 750 in FIG. 7, using the CAN ID 110, the CAN CTRL 116 and CAN PAYLOAD 118 in a data store 700, produces the bit value of scrabbled data (s-[ID|CTRL|PAYLOAD]). The function may use two global indexes that refer to the current element of information to which they are pointing within 700. In addition before starting the first invocation it determines if the number of bits set to 1 in the extended counter is higher than the size of the of CAN ID. If this check is true, a global flag called FLAGBIT is set to 1, otherwise the flag is set to 0.

When the function f is invoked to a specific bit of the extended counter, first there is a check if the bit positioning is part of the CAN CTRL field. If this is true, the outcome is the related bit of the CAN CTRL field 116. If this is not the case, the function checks if the value of the extended counter bit is equal to the FLAGBIT. If this check is true, the outcome is the value of the first not already selected bit of the CAN ID, otherwise the value is that of the first not already selected bit of the CAN PAYLOAD.

Figure 8:
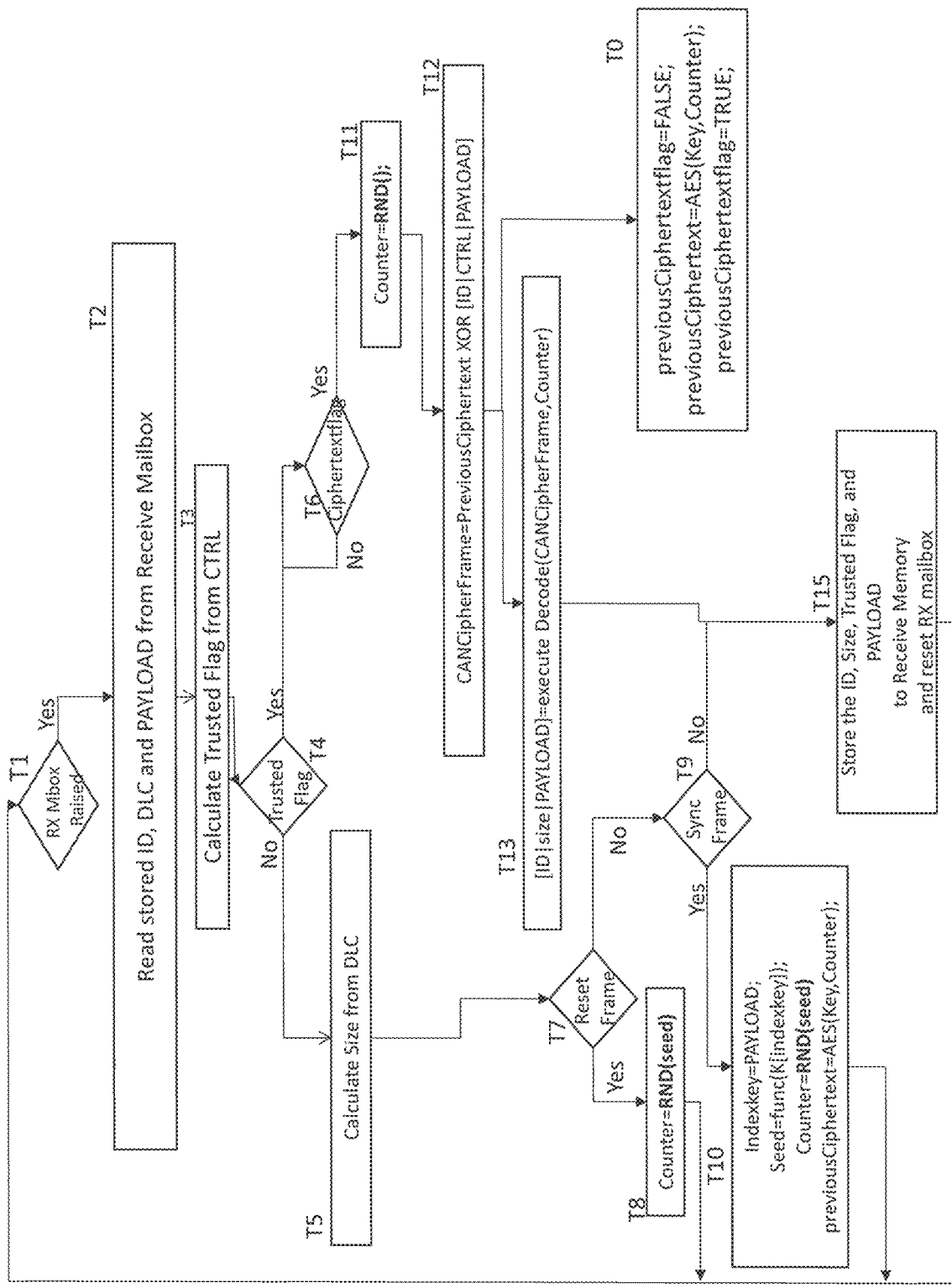
FIG. 8 shows a method flow for the receiving of frames.

Reference is made to FIG. 8 which shows a method of receiving a frame.

The method is initialized with step T0 and then starts executing the step T1.

In step T1, it is determined if a new CAN frame is received by checking if the receive mailbox has been raised. If yes, then the next step is step T2. If not, it is determined again if a new CAN frame is received.

In step T2, the values of the ID, CTRL and Payload are read from the receive mailbox. The next step is step T3.

In step T3, the trusted flag is determined from the trusted bit field, which can be as discussed previously. The next step is step T4.

In step T4, it is determined if the trusted flag is true. If yes, then the next step is step T6 otherwise the next step is step T5.

In step T5, the size of the payload is determined from the CTRL. The next step is step T7.

In step T6, it is determined if the Cipher text flag is true. If no, then the next step is step T6 otherwise the next step is step T11.

In step T7, it is determined if the frame received is a reset frame. This is determined if a special ID code is used and optionally using some payload information. If not, then the next step is step T9, otherwise the next step is step T8.

In step T8, the RND function is reset. It means that it start with the first number again. The next step is step T1.

In step T9, it is determined if the frame received is a sync frame. This is determined with a special ID code is used and optionally using some payload information. If no, then the next step is step T14, otherwise the next step is step T10.

In the step T10, the index of the current key is reset to a value calculated by the value of the payload modulo the maximum number of stored keys. Then, the new seed is calculated using a custom function which takes as argument the value of K(index). The counter is calculated as counter=RND(seed) and the Previous Cipher text is determined using any suitable cryptographic function applied to the key[index] and counter. The next step is step T1.

In step T11, the counter is updated by calling the random number function. The next step is step T12.

In step T12, the encrypted frame is XORed by the XOR function with the previous output of an AES or any other cryptographic function. The outcome of the XOR operation is again another CAN frame that is stored in CAN cipher Frame. The next steps are steps T0 and T13 that are executed in parallel.

In step T13, a decode function applied to the CAN cipher Frame and the current value of the counter is executed and a plain CAN Frame is obtained. From this frame the CAN identifier and Payload are stored respectively in ID and PAYLOAD fields, while the size is calculated from the DLC field. The next step is step T15.

In step T14, the previous cipher text flag is changed to false, a new previous cipher text value is calculated and the previous cipher text flag is set to true. This is similar to step S10 but for the decryption.

In step T15, the values of ID, size, Trusted flag and payload are stored to the receive memory and the RX mailbox is reset. The next step is T1.

The examples previously discussed have used the AES algorithms. It should be appreciated that other embodiments may use any other suitable encryption/decryption algorithms such as SHA-2 or the like.

Figure 9:
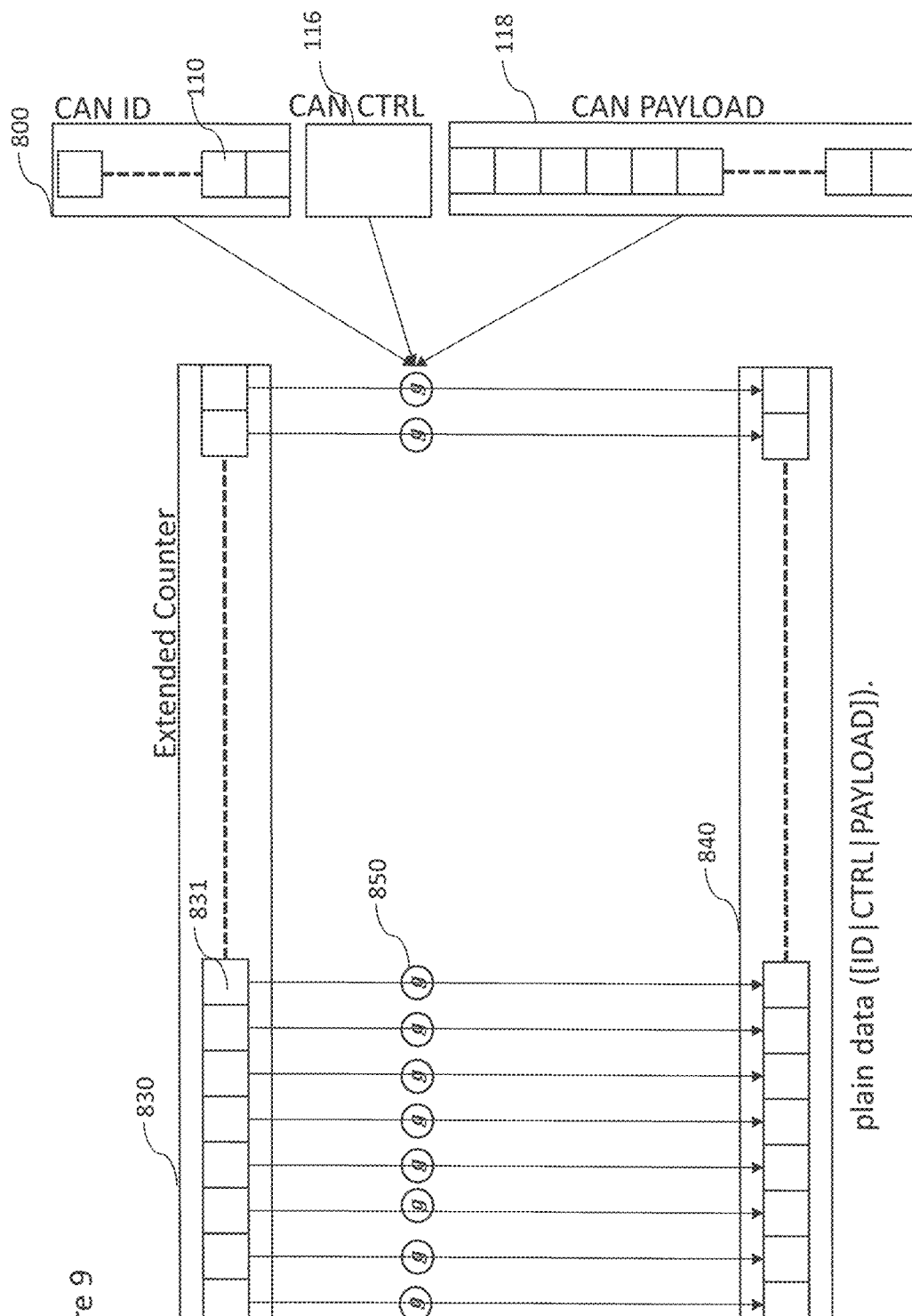
FIG. 9 shows the descrambling of data.

Reference is made to FIG. 9 which shows the method for obtaining the plain CAN FRAME information at the decryption side. The counter 153 of FIG. 5 is shown in FIG. 9 as being extended to a number of bits equal to sum of the size of CAN ID 110 (this may include the parts of FIG. 2 referenced 109 and 114), CAN control 116 and CAN PAYLOAD 118 using a predefined function. The extended counter is referenced 830 and is shown in FIG. 8 as a set of bits 831.

A buffer 840 is where the CAN ID and CAN PAYLOAD have been decoded.

In order to obtain a plain CAN ID, DLC, and payload ([ID|DLC|PAYLOAD]) the same function g (referenced 850) is applied in a sequential way to each bit of the extended counter. In other words the function g is first applied to bit 0, than to bit 1 and so on. The outcome of the function g 850 using the scrambled CAN ID, the CAN CTRL and scrambled CAN PAYLOAD from data store 800 produces the value of plain data ([ID|CTRL|PAYLOAD]) in. The function may use two global indexes that refer to the current element of information to which they are pointing. In addition before starting the first invocation it determines if the number of bits set to 1 in the extended counter is higher than the size of the of CAN ID. If this check is true, a global flag called FLAGBIT is set to 1 otherwise the flag is set to 0.

When the function g 850 is invoked to a specific bit of the extended counter, first there is a check if the bit positioning is part of the CAN CTRL field. If this is true, the outcome is the related bit of the CAN CTRL field. If instead this is not the case, it checks if the value of the extended counter bit is equal to the FLAGBIT. If this check is true, the outcome is the value of the first not already selected bit of the scrambled CAN ID otherwise the value is of the of the first not already selected bit of the scrambled CAN PAYLOAD.

Figure 10:
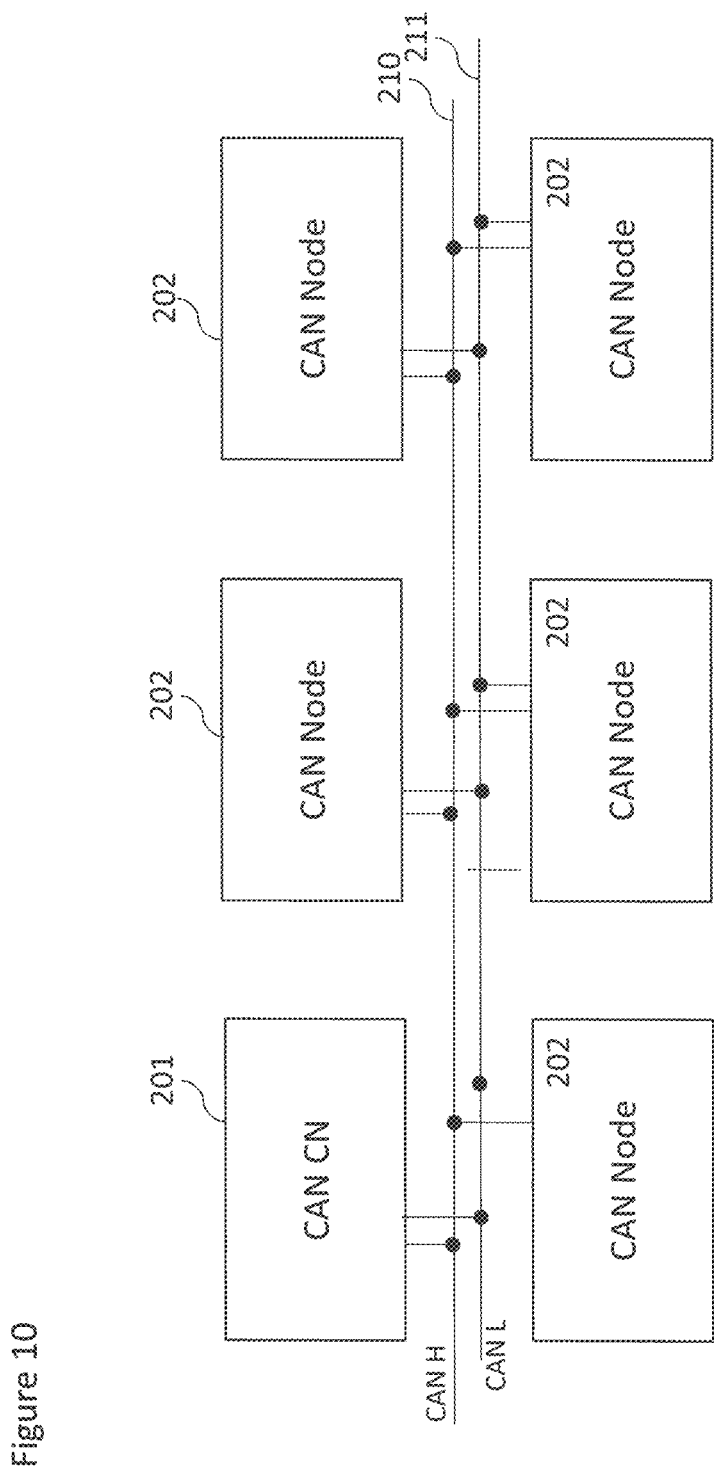
FIG. 10 shows a CAN network with a control node and other nodes.

Reference is made to FIG. 10 which shows a CAN system which a CAN node has been elected as credential node 201 and various other nodes 202 coupled to the CAN bus represented by signals 210 and 211. The credential node 201, as will be described more detail later is able to set up a trusted group comprising the credential node itself and one or more of the CAN nodes 202 in the system.

Figure 11A:
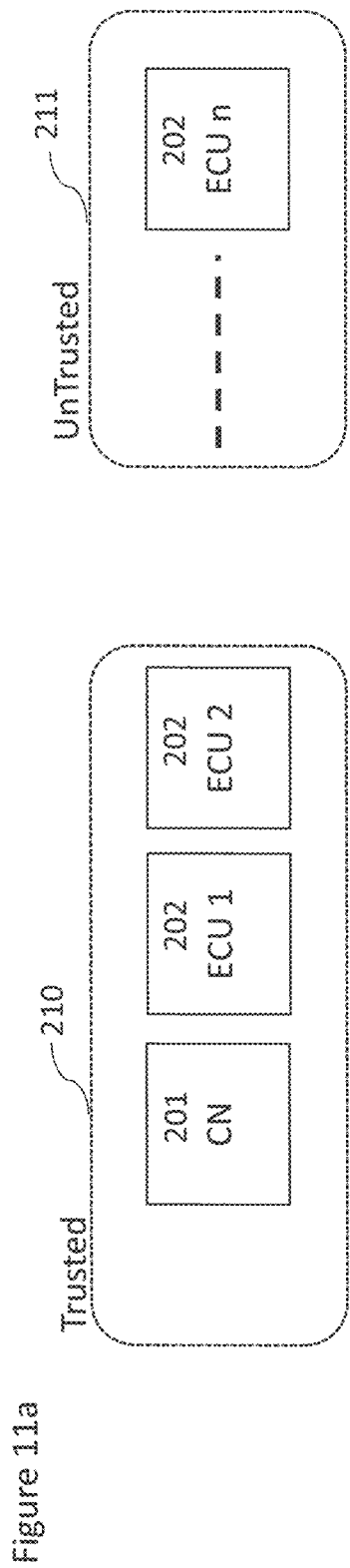
FIGS. 11a, 11b and 11c show various examples of trusted and untrusted domains in a CAN network.
Figure 11B:
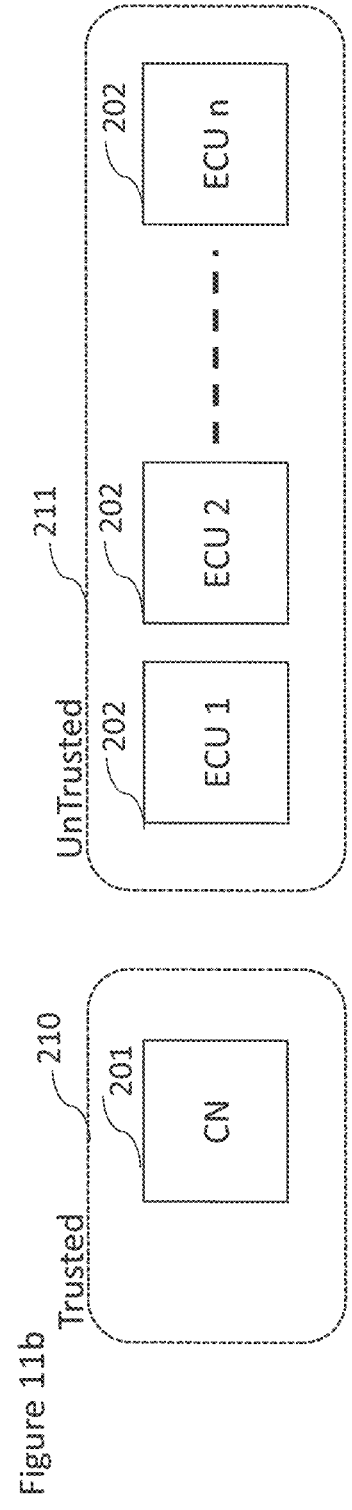
Figure 11C:
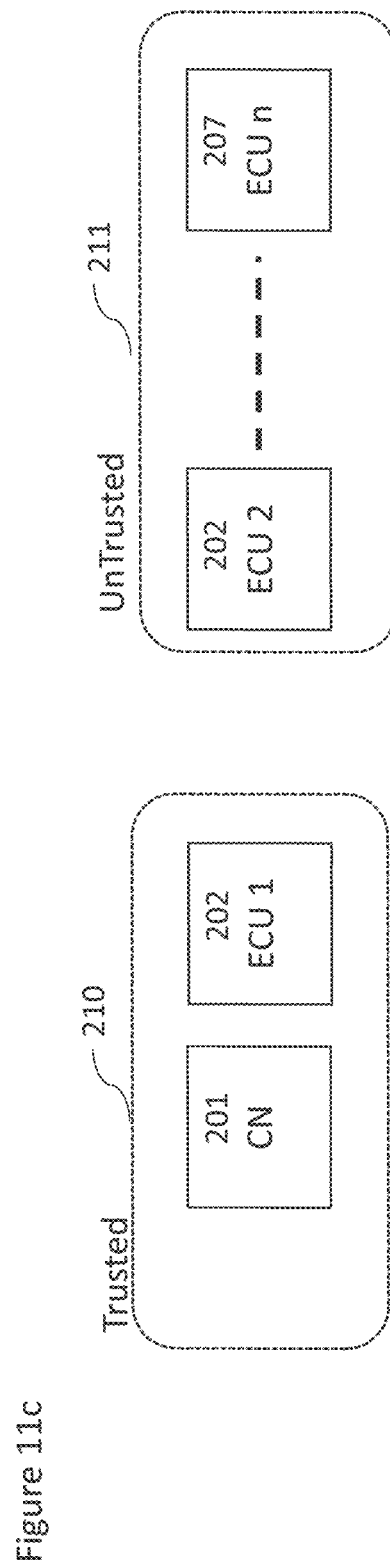

In this regard, reference is made to FIGS. 11a to c which show various different examples of a system with trusted and untrusted parts.

For example, in the scenario of FIG. 11a, the credential node 201 is in a trust group 210 with two other CAN nodes 202. There is an untrusted group 211 with various other untrusted nodes 202.

In the arrangement of FIG. 11b, only the credential node 201 is in the trust group 210 and the remainder of the other nodes 202 are in the untrusted group.

In the arrangement shown in FIG. 11c, the trust group comprises the credential node 201 and one other CAN 202. The remaining nodes 202 are in untrusted group.

In some embodiments a secure key exchange mechanism is used to share secret keys between different CAN nodes. For example the Diffie-Hellman D-H key exchange method may be used. D-H is a specific method of securely exchanging cryptographic keys over a public channel and was one of the first public-key protocols as originally conceptualized by Ralph Merkle and named after Whitfield Diffie and Martin Hellman.

In some embodiments, a trusted group can be formed where all the nodes share the same key.

The following variables are used in some embodiments related to the credential node:

Skey—denotes the initial secret and private key;

Suid—denotes the unique identifier associated to the node;

Sid—denotes the set of Suids that are allowed to join the trusted group;

T-Pkey—denotes trusted group public key and is shared with all nodes of the trusted group;

T-Skey—denotes trusted group secret key and is shared with all nodes of the trusted group;

RN is a vector identifying the trusted group and includes the list of unique random numbers generated by the CAN nodes. The index denotes the id number of the trusted node; and Pid identifies all nodes that are running correctly and may be eligible to be part of the trusted group. It includes the list their public identifiers. Each node also has a public id number.

The following variables are used in some embodiments related to any node:

Skey—denotes the initial secret and private key;

Pkey—denotes the initial public key;

Suid—denotes the unique identifier associated to the node;

T-Pkey—denotes the trusted group public key. This key is shared with all nodes of the trusted group;

T-Skey—denotes trusted group secret key. This key is shared with all nodes of the trusted group; and Pid identifies the public id associated with the node.

The central authority is the credential node 201, which has the responsibility to build the trusted group by distributing the keys.

Initially the trusted group includes {credential node 201} having shared public key denoted by Pkey.

The credential node 201 includes several nodes in the trusted group, first establishing a point to point communication then authenticating them.

The credential node 201 selects the first candidate node 202 by sending a CAN frame. When that first candidate node 202 receives this frame, the candidate node sends back to the credential node 201 a CAN frame having the Target ID set to "a" and its temporary public key. In addition it computes the trusted group secret key.

The first candidate node exchanges with credential node 201 its unique ID using the trusted group security key.

The credential node 201 when it receives the CAN frame from the first candidate node recalculates its trusted group security key and the new Pkey.

Now the security group includes the credential node 201 and the first candidate node and has a shared public key denoted by Pkey*.

The credential node 201 now can start to select another candidate node and repeat the previous steps.

Figure 12A:
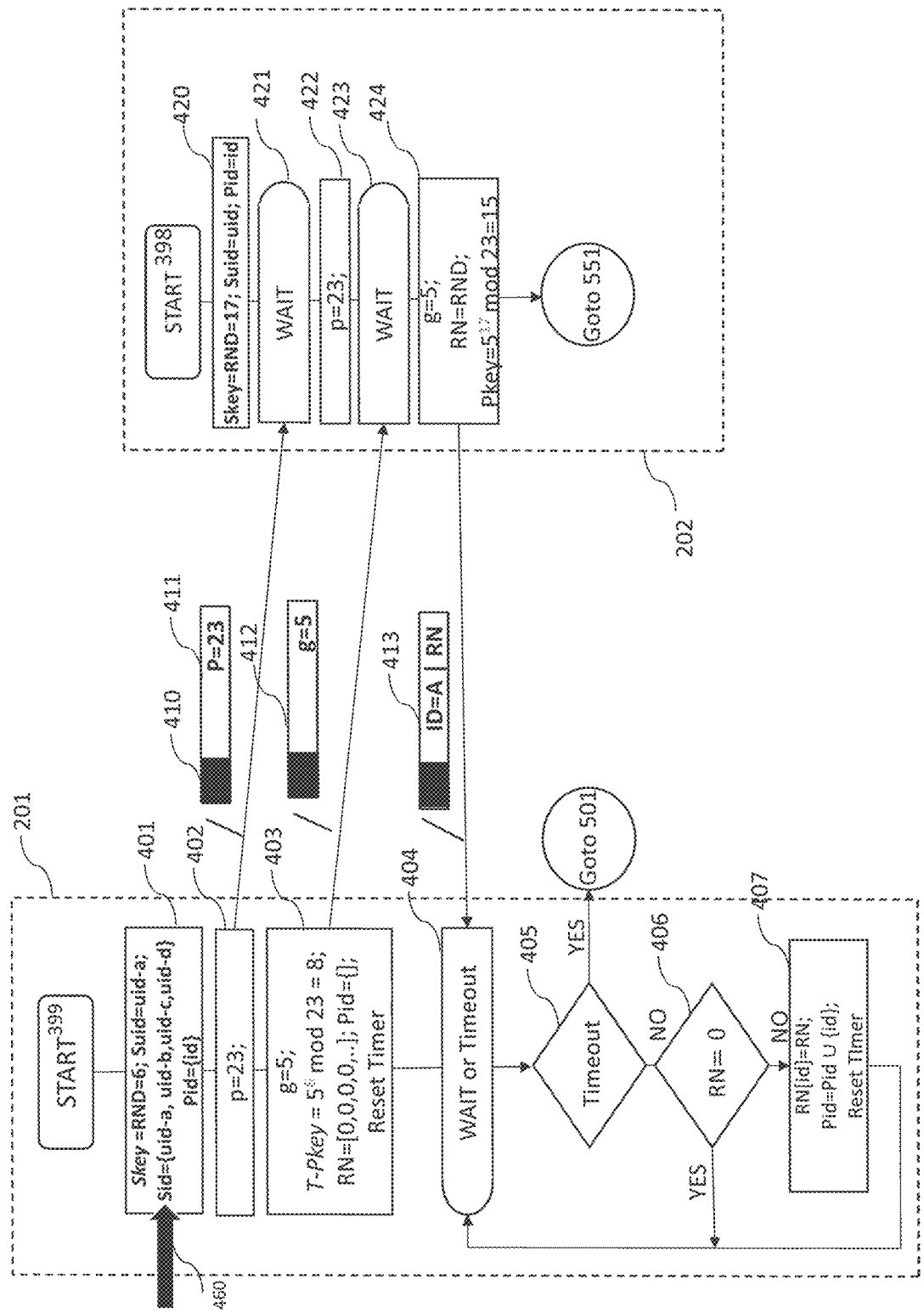
FIGS. 12a, 12b and 12c show a method for establishing a trusted group.
Figure 12B:
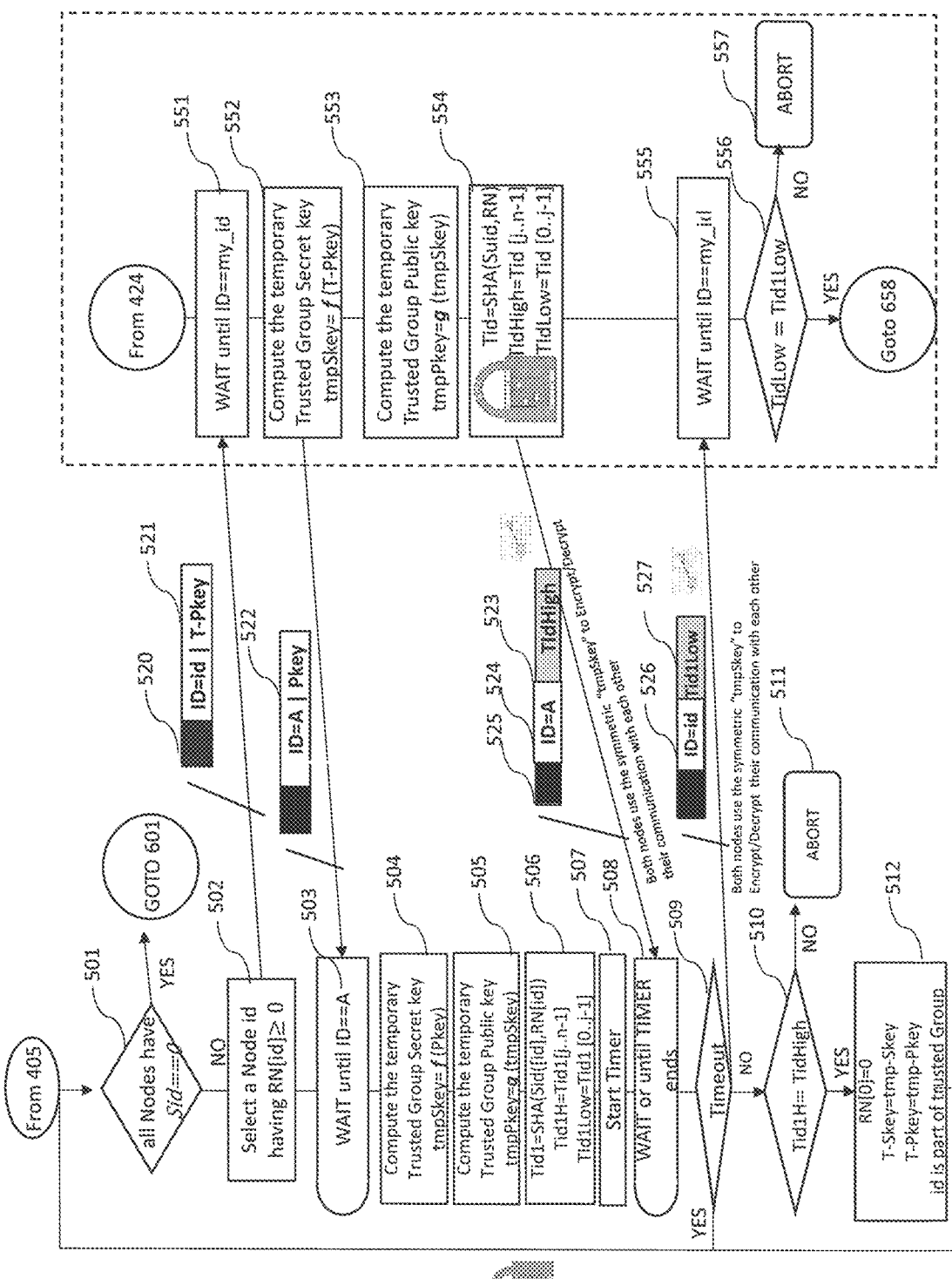
Figure 12C:
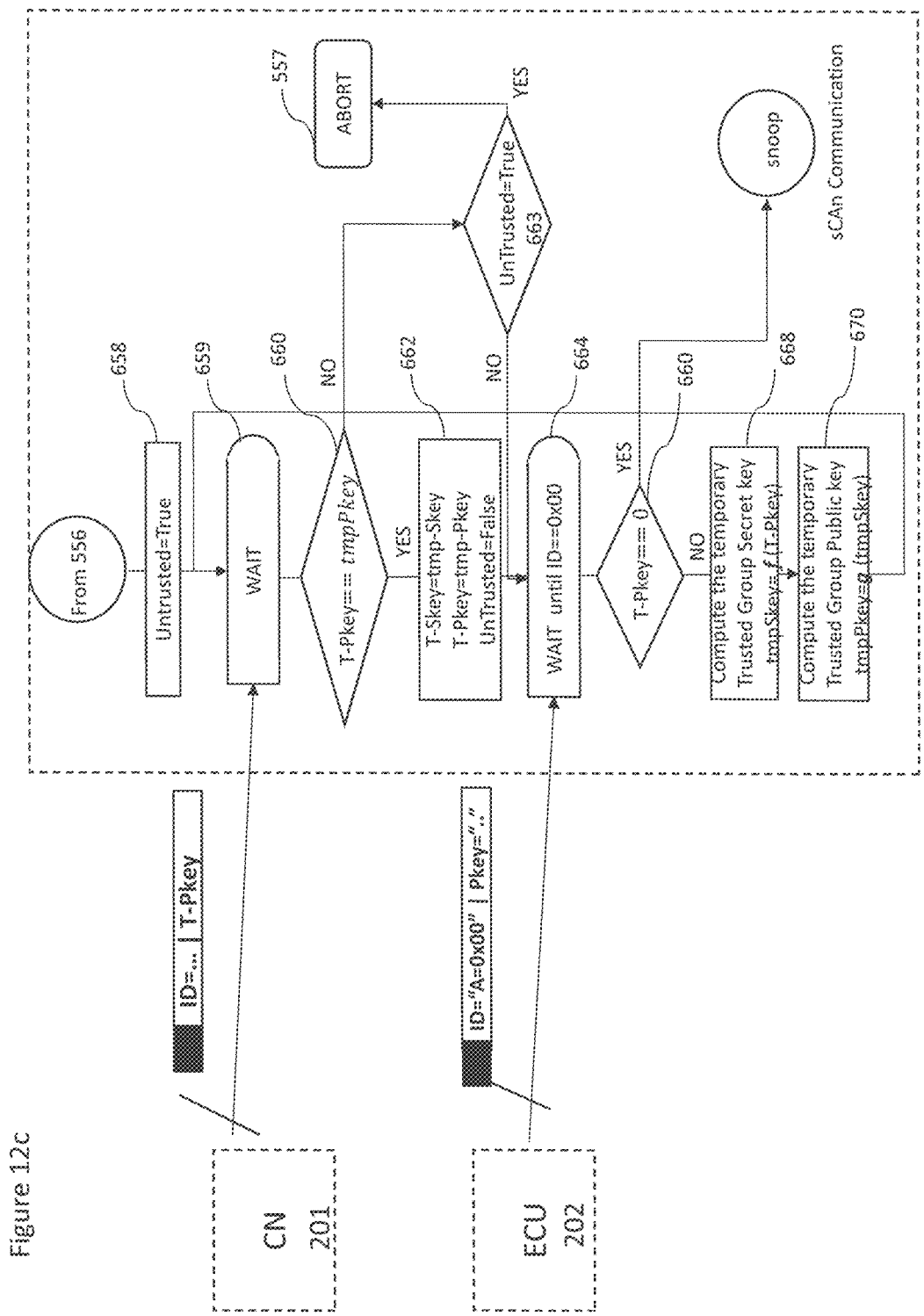

Reference is made to FIGS. 12*a* to *c* which show a method of establishing a trusted group.

Reference is made first to FIG. 12*a* which shows the steps carried out by the credential node 201 on the left hand side and the steps carried out by the candidate node on the right hand side.

Starting the steps carried out by the credential node:

The method starts in step 399.

In step 401, the following are installed:

Skey=RND=6; (initial secret and private key) that is calculated calling the random number function;

Suid=uid-a; (unique identifier of the credential node);

Sid={uid-a, uid-b,uid-c,uid-d} (the set of unique identifiers of the nodes that are allowed to join the group; and Pid={id} (public id of node).

This is denoted by arrow 460 which represents any system enabled to install the list of unique public identifiers of the nodes that will be part of the trusted group. The system can be manual keyboard, remote installation or any suitable method.

In step 402, p is set to any suitable number. For illustrative purposes, p is set to 23. This is the modulus which is used. A CAN frame 411 is sent to the candidate node which is associated with step 421. The CAN frame has an ID part 410 and a data part 421 as previously described. The value of p is provided in the CAN PAYLOAD.

In step 403, base g=5 is set. Again g can have any suitable value and is set to 5 by way of example. The T-Pkey is determined as follows:

T-Pkey=$5^6$ mod 23=8;

RN=[0,0,0,0, . . . ]; Pid={ }.

The timer is reset. A further CAN frame 412 is sent to the candidate node which is associated with step 423. This will have the value of the base g in the data part of the PAYLOAD.

In step 404, the credential node waits for a response CAN frame from the candidate node. The response frame will have in the PAYLOAD a field denoting the public ID of CN node and the remaining field contains the value of the random number calculated in step 424 (described later).

In step 405, it is determined if there is a timeout. If so, the next step is step 501 of FIG. 12*b*. If not, the next step is step 406.

In step 406 it is determined in RN is equal to 0. If yes, the next step is 404. If not, the next step is step 407.

In step 407, RN[id]=RN; Pid=Pid∪{id}; and the timer is reset.

In the candidate node, the method starts at step 398.

In step 420, the candidate node has the following:

Skey=RND=17; Suid=uid; Pid=id.

In step 421, the candidate node waits for the data frame with p.

In step 422, the candidate node has the value of p, that is 23.

In step 423, the candidate node waits for the data frame with g.

In step 424, the candidate node has the value of g, that is 5. Using RN=RND, the Pkey is initial public key is determined Pkey=$5^{17}$ mod 23=15. The candidate node then send A I id|RN to the credential node in the data part of a CAN frame 413. The letter "A" refers to the public id of the CN node, while, Id is the local public id, RN is the value of Random number.

The next step is then step 551 of FIG. 12*b*.

Referring now to FIG. 12*b*, as far as the credential node is concerned, step 405 of FIG. 12*a* progresses to step 501 of FIG. 12*b*.

In step 501, it is determined if all nodes have in Sid set has made a request. If so, the method goes to a normal communication mode. The Trusted group has been set up.

If not, the next step, is set 502. In step 501, a Node id having RN[id]≥0 is selected. A CAN frame 520 is sent to the candidate node with an user ID field (first byte of payload) =id and T-Pkey which is associated with step 551 in the candidate node.

In step 503, the wait statement is performed.

In step 504, the temporary Trusted Group Secret key is computed -tmpSkey=f (Pkey).

In step 505, the temporary Trusted Group Public key is computed -tmpPkey=g (tmpSkey).

In step 506, the target id Tid is determined.

Tid1=SHA(Sid([id],RN[id]).

Tid1H=Tid1[j . . . n−1] denotes bits with high indexes.

TId1Low=Tid1 [0 . . . j−1 denotes bits with low indexes.

In step 507, the timer is started.

In step 508, the control waits for a CAN frame 525 from the candidate node of the timer to time out. This CAN frame will have the ID 524 equal to A and the TidHigh value 523. Both nodes use the symmetric "tmpSkey" to Encrypt/Decrypt their communication with each other.

In step 509, it is determined if there is a timeout. If yes, the next step is step 501. If not the next step is step 510. The credential node will send a CAN packet 526 with the ID 526 equal to id and the Tid1Low value 527.

In step 510 it is determined if the Tid1H value determined in the credential node is the same as the Tid1H value which is received from the candidate node. If not the method is aborted in step 511. If yes, the next step is step 512.

In step 512, RN[0]=0.

T-Skey=tmp-Skey.

T-Pkey=tmp-Pkey.

The id of the candidate node is now is part of trusted Group.

The steps of FIG. 12b performed in the candidate node will now be described.

In step 551, which follows step 424 of FIG. 12a, the candidate node will wait until a CAN frame 520 from the credential node is received with the ID of that candidate node.

In step 552, the candidate node will compute the temporary Trusted Group Secret key tmpSkey=f (T-Pkey).

In step 553, the candidate node will compute the temporary Trusted Group Public key tmpPkey=g (tmpSkey).

In step 554, the candidate node determines Tid=SHA (Suid,RN), TIdHigh=Tid [j . . . n−1] and TIdLow=Tid [0 . . . j−1]. The candidate node will transmit the CAN frame 525 to the credential node.

In step 555, the candidate node will wait until a CAN frame 526 from the credential node is received with the ID of that candidate node.

In step 556, it is determined if the Tid1L value determined in the candidate node is the same as the Tid1H value which is received from the credential node. If not the method is aborted in step 557. If yes, the next step is step 658 in FIG. 12c.

In FIG. 12c a node which is already in the trusted group needs to have its key updated due to the new node entering the trusted group.

In step 658, which follows step 556, it is determine if the node is untrusted.

This is followed by step 659 where the node waits for a CAN frame from the credential node with the T-Pkey.

In step 660, it is determined if T-Pkey==tmpPkey. If not the next step is step 663 where it is determined that the node is untrusted and the method is aborted at step 557.

If it determined that T-Pkey==tmpPkey is true, then the next step is step 662 where the following is determined. T-Skey=tmp-Skey, T-Pkey=tmp-Pkey and Untrusted=False.

In step 664, the node waits for a CAN frame from another CAN node, which is trusted, with a payload having ID="A|Pkey=". . . ".

In step 660, it is determined in T-Pkey==0. If so the next step is to snoop messages such as CAN frame 522. In this case a new node is asking to enter to the trusted group. Therefore all the old nodes already in the trusted group need to update the key accordingly the Diffie-Hellman D-H key exchange algorithm.

If not, the next step is step 668.

In step 668, the node computes the temporary Trusted Group Secret key tmpSkey=f (T-Pkey).

In step 670, the node computes the temporary Trusted Group Public key tmpPkey=g (tmpSkey) and the method returns to step 659.

At the end of the key exchange procedure, which is ended by the credential node, the normal transmission phase is entered.

It should be appreciated that the method shown in FIGS. 12a to c is by way of example only. Some embodiments may for example omit steps 404 to 407 of FIG. 12a. In some embodiments, the functions f and g may be the same. The function may be a modulo function.

It should be appreciated that the above described arrangements may be implemented at least partially by an integrated circuit, a chip set, one or more dies packaged together or in different packages, discrete circuitry or any combination of these options.

For example, the sub-modules 150 and 152 may be implemented in the same or different dies or packages.

The arrangement of FIG. 4b may be at least partially implemented by one or more integrated circuits or dies.

Some embodiments may alternatively or additionally be implemented in hardware.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor or the like. The physical media is a non-transitory media.

Various embodiments with different variations have been described here above. It should be noted that those skilled in the art may combine various elements of these various embodiments and variations.

Such alterations, modifications, and improvements are intended to be part of this disclosure, and are intended to be within the scope of the present invention. Accordingly, the foregoing description is by way of example only and is not intended to be limiting. The present invention is limited only as defined in the following claims and the equivalents thereto.

What is claimed is:

1. An apparatus for use in a system operating in accordance with a Controller Area Network (CAN) protocol, the apparatus comprising:
   encryption circuitry configured to:
      perform an encryption function, the encryption function providing an encryption output in dependence on a key, the key being shared with an other device in the system, wherein the key changes over time; and
      generate an encrypted CAN frame using the encryption output along with data to be output by the apparatus; and
   an output driver configured to cause the encrypted CAN frame to be output onto a CAN bus that is connected to the other device so that the other device can receive the encrypted CAN frame via the CAN bus.

2. The apparatus as claimed in claim 1, further comprising a counter configured to provide a count value to the encryption function, the encryption output being dependent on the count value.

3. The apparatus as claimed in claim 2, wherein the count value of the counter is configured to be synchronized with a counter of the other device.

4. The apparatus as claimed in claim 1, wherein the encryption circuitry is configured to perform a coding function to scramble at least a part of the data to be output.

5. The apparatus as claimed in claim 4, wherein the at least a part of data to be scrambled comprises CAN identity data and CAN payload data.

6. The apparatus as claimed in claim 4, further comprising a counter configured to provide a count value to the encryption function, the encryption output being dependent on the count value, wherein the coding function is configured to receive a count value from the counter to control the scrambling.

7. The apparatus as claimed in claim 6, wherein the coding function is configured to determine a value of a bit of the count value and in dependence on the determined value select a next not already selected bit of CAN identity data or a next not already selected bit of CAN payload data.

8. The apparatus as claimed in claim 6, wherein the coding function is configured to use a current count value of the counter for a particular frame and the encryption output for the particular frame is dependent on a previous count value of the counter.

9. The apparatus as claimed in claim 4, wherein the data to be output comprises information defining a trusted flag, the coding function configured to determine if the data is to be encrypted by determining whether the trusted flag is set.

10. The apparatus as claimed in claim 1, wherein the key is changed in response to one of a reset frame, a synchronization frame, a transmission of n frames where n is an integer greater than or equal to one, or expiry of a predetermined period of time.

11. The apparatus as claimed in claim 1, wherein a priority bit is provided in a CAN identifier of the encrypted CAN frame.

12. An apparatus for use in a system operating in accordance with a Controller Area Network (CAN) protocol, the apparatus comprising:
an input buffer configured to receive an encrypted CAN frame from an other device in the system via a CAN bus; and
decryption circuitry configured to perform an decryption function that provides a decryption output in dependence on a key, the key being shared with the other device in the system, wherein the key changes over time, the decryption output being used to decrypt the encrypted CAN frame to provide a decrypted output.

13. The apparatus as claimed in claim 12, further comprising a counter configured to provide a count value to the decryption function, the decryption output being dependent on the count value.

14. The apparatus as claimed in claim 13, wherein the count value of the counter is configured to be synchronized with a counter value of the other device.

15. The apparatus as claimed in claim 12, wherein the decryption circuitry is further configured to perform a decoding function to descramble at least a part of the decrypted output.

16. The apparatus as claimed in claim 15, wherein the at least a part of the decrypted output to be descrambled comprises scrambled CAN identity data and scrambled CAN payload data.

17. The apparatus as claimed in claim 15, further comprising a counter configured to provide a count value to the decryption function, the decryption output being dependent on the count value, wherein the decoding function is configured to receive a count value from the counter to control the descrambling.

18. The apparatus as claimed in claim 17, wherein the decoding function is configured to determine a value of a bit of the count value with respect to a flag and in dependence on the determined value select a next not already selected bit of CAN identity data or a next not already selected bit of CAN payload data.

19. The apparatus as claimed in claim 17, wherein the decoding function is configured to use a current count value of the counter for a particular frame and the decryption output for the particular frame is dependent on a previous count value of the counter.

20. The apparatus as claimed in claim 15, wherein the encrypted CAN frame comprises information defining a trusted flag, the decoding function configured to determine if data is to be decrypted by determining if the trusted flag is set.

21. The apparatus as claimed in claim 12, wherein the key is changed in response to a reset frame, a synchronization frame, a transmission of n frames where n is an integer greater than or equal to one, or expiry of a predetermined period of time.

22. The apparatus as claimed in claim 12, wherein a priority bit is provided in a CAN identifier of the encrypted CAN frame.

23. A method for use in a system operating in accordance with a Controller Area Network (CAN) protocol, the system including a plurality of devices coupled to a CAN bus, the method comprising:
providing, by a first device of the plurality of devices, an encryption output, the encryption output being dependent on a key, the key being shared between the plurality of devices in the system, wherein the key changes over time;
generating, by the first device, an encrypted CAN frame, the encrypted CAN frame being dependent on the encryption output and data to be output onto the CAN bus; and
outputting the encrypted CAN frame onto the CAN bus.

24. A method for use in a system operating in accordance with a Controller Area Network (CAN) protocol, the system including a plurality of devices coupled to a CAN bus, the method comprising:
receiving, by a second device of the plurality of devices, an encrypted CAN frame output from a first device via the CAN bus;
providing, by the second device, a decryption output, the decryption output being dependent on a key, the key being shared by the plurality of devices, wherein the key changes over time; and
using, by the second device, the decryption output to decrypt the encrypted CAN frame to provide a decrypted output.

* * * * *